(12) United States Patent
Huang et al.

(10) Patent No.: US 8,263,815 B2
(45) Date of Patent: Sep. 11, 2012

(54) MEMBRANE AUGMENTED DISTILLATION TO SEPARATE SOLVENTS FROM WATER

(75) Inventors: Yu Huang, Palo Alto, CA (US); Richard W. Baker, Palo Alto, CA (US); Ramin Daniels, San Jose, CA (US); Tiem Aldajani, San Jose, CA (US); Jennifer H. Ly, San Jose, CA (US); Franklin R. Alvarez, Cincinnati, OH (US); Leland M. Vane, Cincinnati, OH (US)

(73) Assignees: Membrane Technology and Research, Inc., Menlo Park, CA (US); United States Environmental Protection Agency, Washington, DC (US)

( * ) Notice: Subject to any disclaimer, the term of this patent is extended or adjusted under 35 U.S.C. 154(b) by 185 days.

(21) Appl. No.: 12/674,808

(22) PCT Filed: Aug. 27, 2008

(86) PCT No.: PCT/US2008/074488
§ 371 (c)(1),
(2), (4) Date: Feb. 23, 2010

(87) PCT Pub. No.: WO2009/029668
PCT Pub. Date: Mar. 5, 2009

(65) Prior Publication Data
US 2011/0130598 A1    Jun. 2, 2011

Related U.S. Application Data

(60) Provisional application No. 60/966,434, filed on Aug. 27, 2007.

(51) Int. Cl.
*C07C 27/34* (2006.01)
*B01D 3/14* (2006.01)

(52) U.S. Cl. ............ 568/917; 203/25; 202/200
(58) Field of Classification Search ................ 568/917; 203/25; 202/200
See application file for complete search history.

(56) References Cited

U.S. PATENT DOCUMENTS

| | | | |
|---|---|---|---|
| 4,405,409 A | 9/1983 | Tusel et al. | |
| 4,539,076 A | 9/1985 | Swain | |
| 4,978,430 A | 12/1990 | Nakagawa et al. | |
| 5,035,776 A | 7/1991 | Knapp et al. | |
| 5,105,029 A | 4/1992 | Ninomiya et al. | |
| 7,297,236 B1 | 11/2007 | Vander Griend | |
| 7,594,981 B2 | 9/2009 | Ikeda | |
| 2006/0070867 A1* | 4/2006 | Ikeda | 203/25 |
| 2008/0216649 A1 | 9/2008 | Huang et al. | |
| 2011/0130598 A1 | 6/2011 | Huang et al. | |

FOREIGN PATENT DOCUMENTS

| | | |
|---|---|---|
| EP | 1614458 | 1/2006 |
| JP | 07227517 | 8/1995 |

OTHER PUBLICATIONS

International Search Report and Written Opinion dated Feb. 4, 2009, issued in International Application No. PCT/US2008/074488.
Hashimoto, Koichi, "Economical Improvement of Membrane Separation by the Combination with Vapor Compression," Short Communication: MEMBRANE, 11 (5), 303-305 (1961).

* cited by examiner

*Primary Examiner* — Sikarl Witherspoon
(74) *Attorney, Agent, or Firm* — Weaver Austin Villeneuve & Sampson LLP

(57) ABSTRACT

Processes for removing water from organic solvents, such as ethanol. The processes include distillation to form a rectified overhead vapor, compression of the rectified vapor, and treatment of the compressed vapor by two sequential membrane separation steps.

32 Claims, 12 Drawing Sheets

(Not in accordance with the invention)

(Not in accordance with the invention)

MEMBRANE AUGMENTED DISTILLATION TO SEPARATE SOLVENTS FROM WATER

This application is related to International Application No. PCT/US2008/074488 filed on Aug. 27, 2008, the priority of which is claimed pursuant to 35 USC 120 and 365. The prior application claims the benefit of U.S. Provisional Application Ser. No. 60/966,434, filed Aug. 27, 2007 under 35 USC 119 and 363. Both applications are incorporated herein by reference in their entirety.

This invention was made in part with Government support under award number DE-FG02-04ER84001, awarded by the United States Department of Energy, and in part under a Cooperative Research and Development Agreement (CRADA) between the United States Environmental Protection Agency and Membrane Technology and Research, Inc. The Government has certain rights in this invention.

FIELD OF THE INVENTION

The invention relates to dehydration of solvents, especially alcohols. In particular, the invention relates to combinations of distillation, overhead vapor compression and membrane separation to produce a dehydrated solvent product.

BACKGROUND OF THE INVENTION

The production of dry solvents from raw aqueous mixtures is often costly and complicated. The preparation of dry ethanol is a good example. In the conventional process, the raw fermentation broth is stripped under moderate vacuum in a beer still. Overhead vapor from the beer still is sent to a rectification column that produces an overhead product close to the azeotrope (about 93 wt % ethanol) and a bottoms product, which is essentially water. The condensed product from the top of the column is evaporated under pressure and fed to a molecular sieve dryer, which produces ethanol of 99 wt %+ purity. Such a process consumes almost 100 million Btu/h to produce 50 million gallons per year of purified ethanol from a feed containing about 11 wt % ethanol.

It is known to use membrane separation for dehydration. Such processes are described in co-owned and copending patent application Ser. Nos. 11/715,245 and 11/897,675, for example.

It is also known to use membrane separation to treat the overhead stream from a column. Co-owned and copending Ser. No. 11/494,900 teaches a process for recovering ethanol involving membrane separation, followed by dephlegmation, followed by a second membrane separation step to dehydrate the overhead stream from the dephlegmator.

U.S. Published Application number 2006/0070867 teaches a combined distillation/membrane separation process in which the overhead vapor from the column is condensed, then a portion of the vapor is reboiled before passing as feed to the membrane separation step.

Japanese Published Application number JP7227517 teaches the use of a membrane separation step to treat the overhead from a stripping column, with the permeate from the membrane separation step being returned to the stripping column.

There remains a need for a process that is both energy efficient and cost effective for producing high purity dehydrated solvents, especially ethanol.

SUMMARY OF THE INVENTION

The invention is a process for dehydrating solvents, particularly solvents that are readily miscible with water, and especially ethanol.

The process incorporates distillation, vapor compression, and two membrane separation steps. The steps are integrated in such a way as to provide an operation that has both good energy efficiency and reasonable costs.

In a basic embodiment, the process of the invention includes the following steps:
(a) subjecting a solvent/water mixture to a distillation step comprising a stripping step performed in a stripping section and a rectification step performed in a rectification section, to produce a rectified vapor stream and a bottoms stream;
(b) compressing at least a portion of the rectified vapor stream to form a compressed overhead vapor stream;
(c) performing a first membrane separation step, comprising:
(i) providing a first membrane having a first feed side and a first permeate side, the membrane being selective in favor of water over solvent;
(ii) passing at least a portion of the compressed overhead vapor stream at a first feed pressure across the first feed side;
(iii) maintaining a first permeate pressure on the first permeate side that is lower than the first feed pressure;
(iv) withdrawing from the first feed side a first residue vapor stream enriched in solvent compared with the first compressed overhead vapor stream;
(v) withdrawing from the first permeate side a first permeate stream enriched in water compared with the first compressed overhead vapor stream;
(d) performing a second membrane separation step, comprising:
(i) providing a second membrane having a second feed side and a second permeate side, the membrane being selective in favor of water over solvent;
(ii) passing at least a portion of the first residue vapor stream at a second feed pressure across the second feed side;
(iii) maintaining a second permeate pressure on the second permeate side that is lower than the second feed pressure;
(iv) withdrawing from the second feed side a dehydrated solvent product;
(v) withdrawing from the second permeate side a second permeate stream enriched in water compared with the first residue vapor stream;
(e) recovering latent heat of condensation from the first permeate stream by returning the first permeate stream as a vapor to the stripping section.

The overall process efficiency is enhanced in several ways. First, the rectified overhead vapor from the column is subjected to vapor compression. This provides driving force for the membrane separation steps, as well as an optional mechanism to recover latent heat by condensing part of the compressed vapor in a reboiler that drives the stripping section.

Secondly, the presence of the membrane separation steps allows useful latent heat recovery from the permeate from the first membrane separation step, which generally has a fairly low ethanol concentration, by returning the permeate to the column at an appropriate low tray position based on its composition. This represents a significant benefit compared with processes in which the permeate is not returned to the column.

Thirdly, the permeate from the second membrane unit, which has a relatively high ethanol concentration, may be condensed. Condensing this stream provides a lowered permeate pressure for the second membrane unit, thereby improving driving force and pressure ratio in this unit. The condensed permeate provides an ethanol rich liquid stream that can be returned to the column to increase ethanol recovery. As a consequence, high levels of ethanol recovery are possible without the use of excessively large membrane areas.

Fourthly, the dehydrated ethanol product is the residue stream from the second membrane unit. Because this product is liquid under normal atmospheric conditions, it can easily be condensed in the reboiler of the stripping section, thereby contributing latent heat of condensation as part of the reboiler heat requirements.

Fifthly, we have found unexpectedly that the use of two membrane separation steps, rather than one, provides the ability to control the process energy consumption, membrane area usage, and operating and capital costs simultaneously.

Lastly, there is no phase change needed between the column overhead and the membrane feed, representing a considerable energy benefit over prior art processes where the overhead withdrawn from the column is first condensed, then revaporized before passing to the membrane unit.

As it relates to ethanol production, the process of the invention includes the following steps:
(a) subjecting an ethanol/water mixture to a distillation step comprising a stripping step performed in a stripping section and a rectification step performed in a rectification section, to produce a rectified vapor stream and a bottoms stream;
(b) compressing at least a portion of the rectified vapor stream to form a compressed overhead vapor stream;
(c) performing a first membrane separation step, comprising:
(i) providing a first membrane having a first feed side and a first permeate side, the membrane being selective in favor of water over ethanol;
(ii) passing at least a portion of the compressed overhead vapor stream at a first feed pressure across the first feed side;
(iii) maintaining a first permeate pressure on the first permeate side that is lower than the first feed pressure;
(iv) withdrawing from the first feed side a first residue vapor stream enriched in ethanol compared with the first compressed overhead vapor stream;
(v) withdrawing from the first permeate side a first permeate stream enriched in water compared with the first compressed overhead vapor stream;
(d) performing a second membrane separation step, comprising:
(i) providing a second membrane having a second feed side and a second permeate side, the membrane being selective in favor of water over ethanol;
(ii) passing at least a portion of the first residue vapor stream at a second feed pressure across the second feed side;
(iii) maintaining a second permeate pressure on the second permeate side that is lower than the second feed pressure;
(iv) withdrawing from the second feed side a dehydrated ethanol product;
(v) withdrawing from the second permeate side a second permeate stream enriched in water compared with the first residue vapor stream;
(e) recovering latent heat of condensation from the first permeate stream by returning the first permeate stream as a vapor to the stripping section.

The rectified vapor is usually compressed by a gas/vapor compressor. As a less preferred alternative, the rectified overhead may be condensed, then pumped under pressure to the membrane separation steps and revaporized under pressure before entering the membrane unit(s).

It is to be understood that the above summary and the following detailed description are intended to explain and illustrate the invention without restricting its scope.

DETAILED DESCRIPTION OF THE INVENTION

Figure 1:
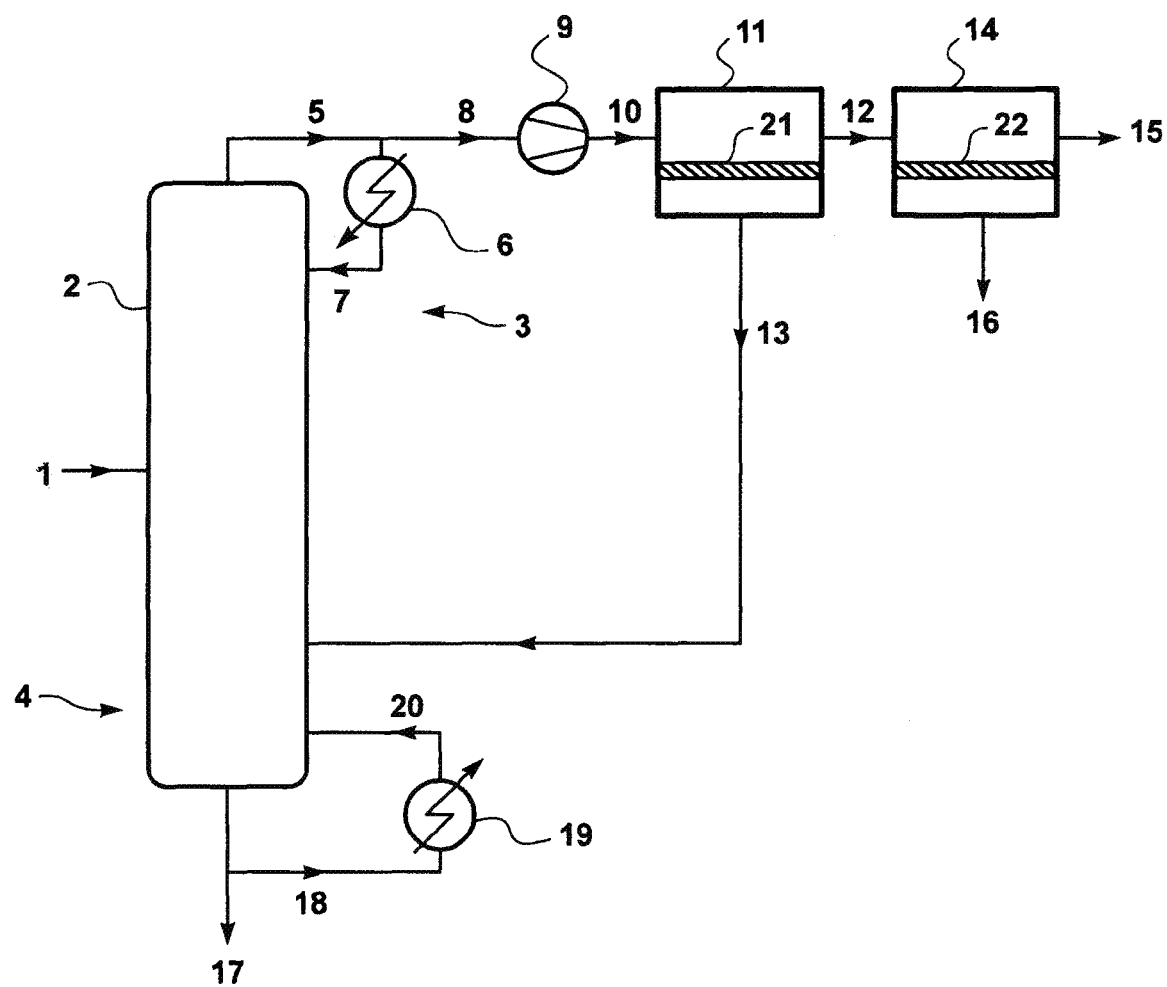
FIG. 1 is a schematic drawing showing the process flow scheme and apparatus elements for a basic embodiment of the invention.

The terms solvent/water solution and solvent/water mixture used herein refer to any mixtures or solutions of any organic solvent and water that are generally liquid at room temperature and pressure, but that may be in the liquid or vapor phase during operation of the process.

The term selectivity as used herein refers to the intrinsic property of a membrane material determined by the ratio of the permeability of two components through the material, as discussed in Chapters 2, 8, and 9 of R. W. Baker, AMembrane Technology and Applications@, $2^{nd}$ Ed., Wiley and Sons, 2004. This selectivity is also expressed as the ratio (water permeance)/(solvent permeance), as measured with membrane samples and with the solvent/water mixture of interest at the operating temperature at which the process is to be carried out.

All liquid mixture percentages herein are by weight unless otherwise stated. Gas or vapor mixture percentages are by volume unless otherwise stated.

The invention is a process for dehydrating solvents, particularly solvents that are readily miscible with water, and especially ethanol.

The process of the invention can be used to separate essentially any solvent/water solution or mixture. We believe the process of the invention is of particular value in separating solutions in which the organic component is in the range $C_1$-$C_6$, that is, has 1 to 6 carbon atoms, or where the solubility of water in the organic liquid at room temperature and pressure is at least about 5 wt %.

By way of example, the process of the invention is particularly useful for separating water from alcohols, ketones, aldehydes, organic acids and esters, including:

ethanol, particularly bioethanol produced from natural sources ($C_2$)
isopropanol ($C_3$)
butanol ($C_4$)
acetone ($C_3$)
formaldehyde ($C_1$)
ABE.

One or multiple organic compounds may be present in the mixture to be separated. A common example of an organic mixture to be treated is ABE, an acetone-butanol-ethanol mixture produced, for example, by fermentation using clostridium organisms, and used as a source of biobutanol and other valuable chemicals.

The feed stream may contain additional components besides organic solvents and water, such as inorganic salts, fermentation debris and the like. The feed stream may come from any source, and may be subjected to pretreatment, such as filtration, to remove contaminants before it enters the distillation column.

Representative sources of the feedstream include processes that manufacture organic solvents and processes that use organic solvents. Feedstreams that are particularly suited to treatment are those from the manufacture of light alcohols, ketones, aldehydes, organic acids and esters by chemical synthesis or fermentation.

Such manufacturing processes include, but are not limited to, chemical syntheses from petrochemical feedstocks, such as ethylene and propylene; fermentation of sugar-containing feedstocks; saccharification/fermentation of cellulosic and lignocellulosic feedstocks; and conversion of carbonaceous materials to syngas, followed by chemical or biochemical production of the desired solvent.

The processes of the invention can treat streams of any solvent/water composition, but are particularly suited to treating those in which the solvent is present at low concentrations, such as below 15 wt %, below 10 wt % or even below 5 wt %, such as only 1 wt % or 3 wt %. Such streams are very hard to treat in an energy efficient and cost-effective manner by prior art processes.

The process incorporates distillation, vapor compression, and two membrane separation steps, with the permeate vapor from the first membrane separation step being returned as vapor to the distillation column. The invention in a basic embodiment is shown in FIG. 1.

Referring to this figure, feed stream, 1, which is usually a liquid, but may be a vapor, is passed into distillation column, 2. The column has an upper rectification section, 3, and a lower stripping section, 4. Cooling for the rectification section is provided at least in part by reflux condenser, 6, in which a portion of the overhead vapor stream, 5, is condensed for return to the column as reflux stream, 7.

Energy for the stripping section is provided at least in part by reboiler, 19, in which a portion, 18, of the liquid bottoms stream, 17, is boiled, typically by heating with steam, for return to the column as heated vapor stream, 20.

The column may be operated at any temperature and pressure appropriate to the separation that is to be carried out. For the separation of common organic solvents as listed above, such as ethanol, it is often preferable to operate the column under a partial vacuum and at elevated temperature. For example, the column may be operated at 0.5 bar pressure with the overhead vapor being withdrawn at 70EC or 80EC.

Rectified vapor stream, 8, is passed from the column to vapor compression step, 9. The compressor increases the pressure of the rectified vapor stream to any desired value, typically to a few bar, such as 3 bar or 4 bar. Although power is required to drive the vapor compressor, the power consumption of the overall process is far below the power consumption that would be required to perform the separation if only the distillation step were used, as is shown in the Examples section below.

The compressed overhead vapor stream, 10, is enriched in solvent. The concentration of solvent in the column overhead depends on the composition of the raw feed and the operating features of the column, such as the number of separation stages, pressure, and temperatures at the base and top of the column. In general, it is preferred to operate the column to deliver an overhead stream containing 60-90 wt % solvent, and most preferably 75-85 wt % solvent, such as about 80 wt % solvent.

The compressed overhead vapor is introduced as a feed stream into the first membrane separation unit, 11, containing membranes, 21. A driving force for membrane permeation is provided by maintaining the permeate side of the membrane at a lower pressure than the feed side. For example, in a typical case, the feed side may be at 3 bar total pressure and the permeate side at 0.5 bar or 0.25 bar pressure, providing a pressure ratio of 6 or 12.

Conveniently, but not necessarily, the permeate pressure is about the same as the pressure in the distillation column, enabling the permeate stream to be returned to the column without adjusting the pressure. As a non-limiting option, a Roots blower or the like may be used to return the permeate to the column, in which case a small pressure differential may exist between the permeate side of the membranes and the column. For example, the permeate side may be at 0.25 bar and the column at 0.5 bar.

The membranes, 21, may be of any type that provides selectivity in favor of water over the organic solvent. In any membrane separation, the enrichment in the permeate stream of the faster permeating component (by which we mean the concentration of that component in the permeate stream divided by the concentration in the feed) can never be greater than the pressure ratio (by which we mean the total pressure on the feed side divided by the total pressure on the permeate side), irrespective of the membrane selectivity.

The first membrane separation step typically operates at a modest pressure ratio, such as less than 30, so a very high selectivity is not needed for this step. In general, the preferred membrane selectivity should be less than 100, and most preferably in the range of 10-100, such as up to about 20, 30, 50 or 60.

A selectivity higher than 100 can even be disadvantageous, as this implies a very low permeance for the slower permeating component, that is, the solvent. The membrane area requirements for the separation are controlled by the slower permeating component, so a very slow permeation rate for the solvent can lead to a very high membrane area requirement.

Subject to the above-preference for membranes of moderate selectivity, suitable membranes that could be used may be found within several classes, including polymeric membranes and inorganic membranes.

Representative water-selective membrane types include, but are not limited to, polymeric membranes having a hydrophilic selective layer, such as polyvinyl alcohol (PVA) or cellulose acetate, or having a hydrophobic selective layer of the type taught in U.S. pending application Ser. No. 11/897,675, copending and co-owned with the present invention.

Yet other suitable membranes include chitosan membranes, and ion-exchange membranes, such as Nafion7 membranes.

Inorganic membranes comprising hydrophilic materials may also be used as dehydration membranes. Such membranes include amorphous silica membranes and membranes including a water permeating zeolite layer, such as ZSM-5. Various types of inorganic membranes may be purchased from Mitsui and Company (USA) of New York, Isotronics of Paradise Valley, Ariz., Sulzer Chemtech Membrane Systems, based in Heinitz, Germany, and Pervatech BV of Enter, Netherlands.

The membrane separation unit can include a single membrane module or a bank or array of membrane modules.

Water permeates the membrane preferentially, to form water-enriched, solvent-depleted permeate stream, 13, in vapor form. This stream is returned to the distillation column, preferably at an appropriate tray position based on the composition of the permeate, that is, the column tray at which the uprising vapor in the column and the permeate vapor have about the same composition.

If the permeate vapor is superheated with respect to the uprising column vapor, it may be desirable to deliver this stream at a slightly lower tray position to maximize the contribution of the super heat.

By returning this vapor stream to the column, the latent heat content of the vapor stream is entirely recovered in the distillation column.

The residue stream, 12, from the first membrane separation step is enriched in solvent compared with the feed stream. Preferably, the first residue stream contains 80-95 wt % solvent, and a typical most-preferred value is about 90 wt % solvent.

The flow rate and composition of the first residue stream depend on the operating features of the first membrane separation step, such as pressure difference, pressure ratio, membrane selectivity and permeance, and membrane area. To achieve the preferred results, the membrane should typically provide a water permeance of at least about 1,000 gpu, and most preferably at least about 2,000 gpu, and a selectivity of at least 20, and preferably between 20 and 100, and the step should be operated at a pressure ratio of at least about 5 or 6.

The first residue stream is passed as feed in vapor form to the second membrane separation unit, 14, containing membranes, 22. The feed and permeate operating pressures and temperatures for the second membrane separation step may be the same or different from those for the first membrane separation step.

In the FIG. 1 design, the second membrane separation step delivers the treated product stream to meet process specifications. These specifications typically call for the water content of the product to be no more than 3 wt %, 2 wt % 1 wt % or even less. Reducing the water content to these low levels may result in considerable solvent losses into the permeate stream. In addition, very large membrane areas may be needed for this step.

We have found that both solvent losses and membrane area can be controlled by increasing the pressure ratio for this step compared with the first membrane separation step.

The pressure ratio may be increased by using a vacuum pump in the permeate line to pull a vacuum on the permeate side. We have found, however, that simply cooling the second permeate stream to condense the stream and create a spontaneous partial vacuum on the second permeate side, as described with respect to FIG. 2 below, will provide an adequate pressure ratio in most cases.

The choices of membrane for the second step are similar to those for the first step. Optionally, the membranes used in the second unit may be different from those used in the first unit. For this step, a higher selectivity may also be beneficial, because the higher pressure ratio made available by lowering the permeate pressure means that this step is generally less pressure ratio limited than the first step. For this step, preferred membranes have selectivities up to 200 or 250.

The first residue stream flows across the feed side of the second membrane unit. The second step produces a second residue vapor stream, 15, which is withdrawn as a dehydrated solvent product. The dehydrated product generally contains at least 90 wt % solvent, and more typically at least 95 wt % solvent. Most preferably, the product is dehydrated to at least 98 wt % or 99 wt % solvent, or better. If greater purity is needed than can conveniently be obtained using two membrane separation steps, one or more additional membrane steps may be used to dehydrate the second residue stream further. Alternatively, the residue stream can be passed to other non-membrane treatments, such as molecular sieve treatment, if desired.

The second step also produces a second permeate stream, 16, which may be discharged to any destination, but preferably is recirculated within the process for additional solvent and heat recovery. For example, the stream may be returned as vapor or as liquid to the column, or to the process from which the raw feedstock comes.

If third or additional membrane separation steps are used, this can provide greater flexibility to configure the process by directing the second and third permeate streams to different destinations.

Figure 2:
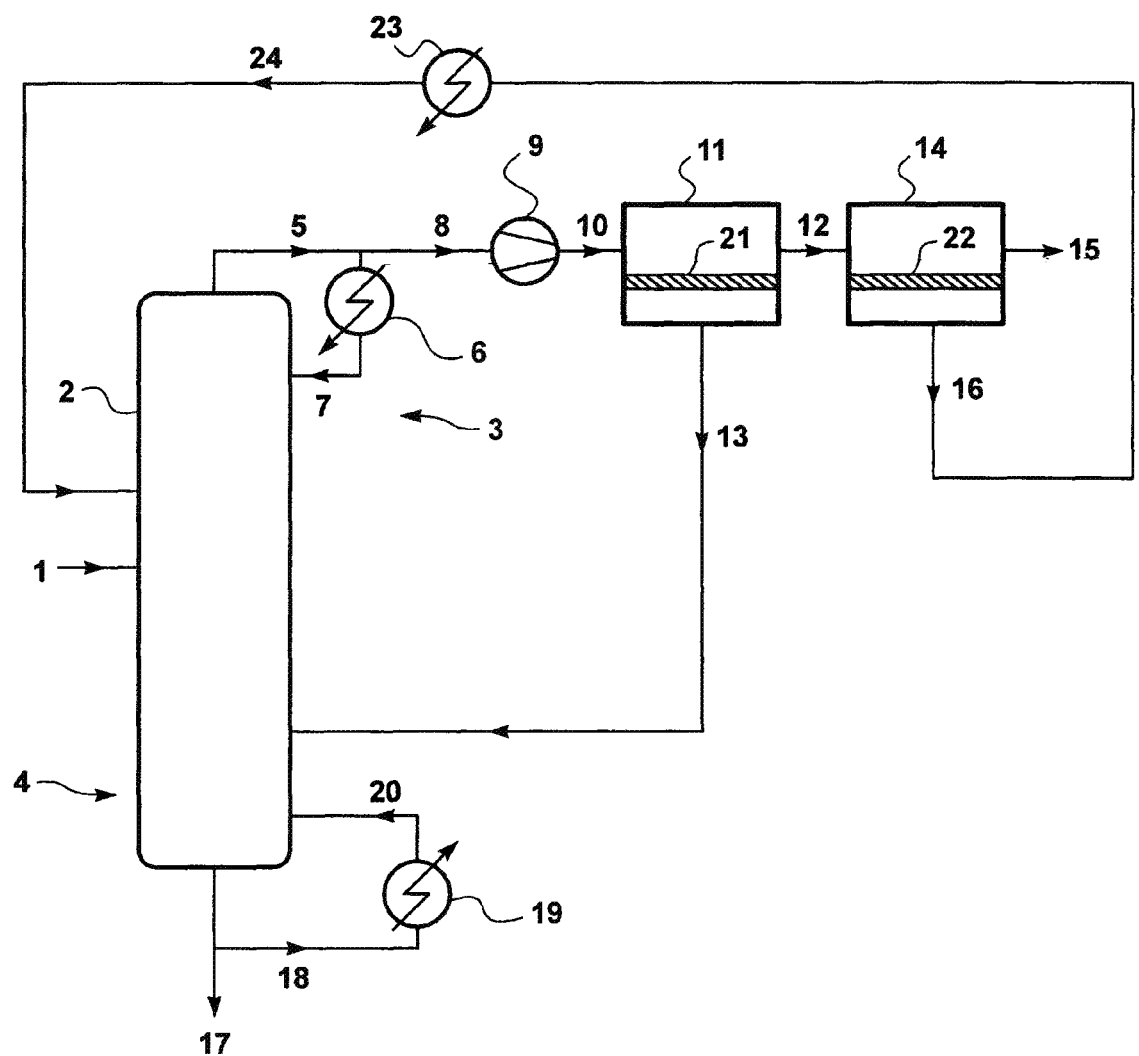
FIG. 2 is a schematic drawing showing an embodiment of the invention in which the second permeate stream is condensed and returned as liquid to the distillation step.

In a preferred embodiment of the invention, the second permeate stream is condensed and returned as liquid to the distillation column. FIG. 2 is a schematic drawing showing such an embodiment, in which like elements are numbered as in FIG. 1. Referring to FIG. 2, the second permeate stream, 16, is withdrawn as a vapor from the second membrane separation step and is passed through condenser, 23, where it is condensed to form liquid recycle stream, 24. This stream is returned to the rectification section of column, 2, and thus forms additional reflux for the column.

Recycle of this permeate stream within the process increases ethanol recovery. As mentioned above, condensation of this stream also creates a partial vacuum on the permeate side of the second membrane separation step. Lowering the permeate pressure both increases the driving force for transmembrane permeation, increasing transmembrane flux, and increases the pressure ratio, improving the ethanol/water separation performance.

Condensation is achieved by cooling, typically by air or water cooling to lower the temperature to below 70EC. By operating in this manner, a pressure of 0.5 bar, 0.1 bar or lower can be reached on the permeate side.

Figure 3:
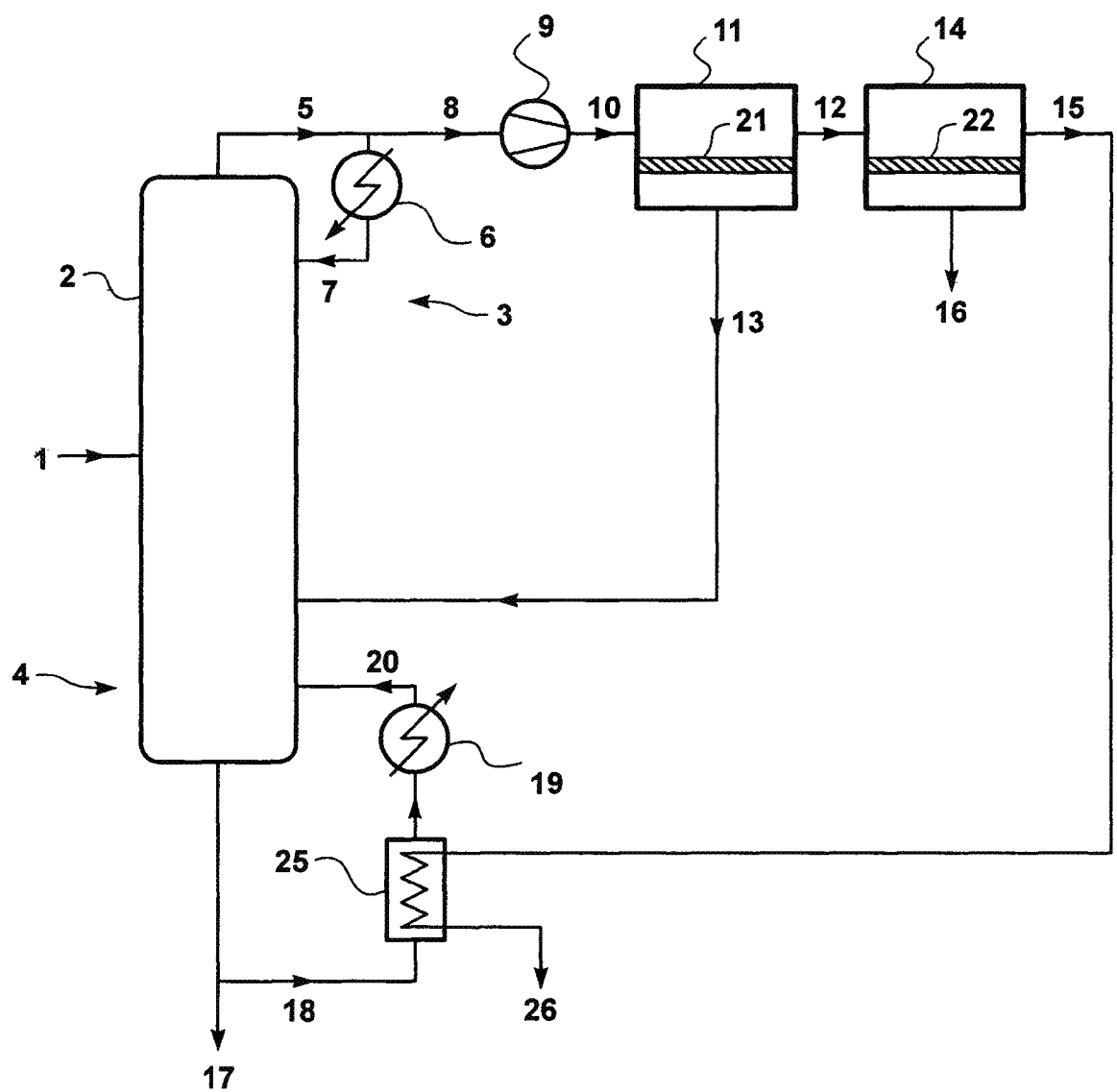
FIG. 3 is a schematic drawing showing an embodiment of the invention in which the second residue vapor stream is brought into heat exchanging contact with the reboiler stream from the base of the stripping section.

Additional heat recovery can be obtained by condensing the dehydrated solvent product vapor stream in the reboiler section of the column, as shown in FIG. 3, in which like elements are numbered as in FIG. 1. Referring to FIG. 3, the second residue stream, 15, is withdrawn as a vapor from the second membrane separation step and is passed through heat exchanger or step, 25, in heat-exchanging relationship with reboiler stream, 18. The resulting condensed product is withdrawn from the process as stream, 26.

Figure 4:
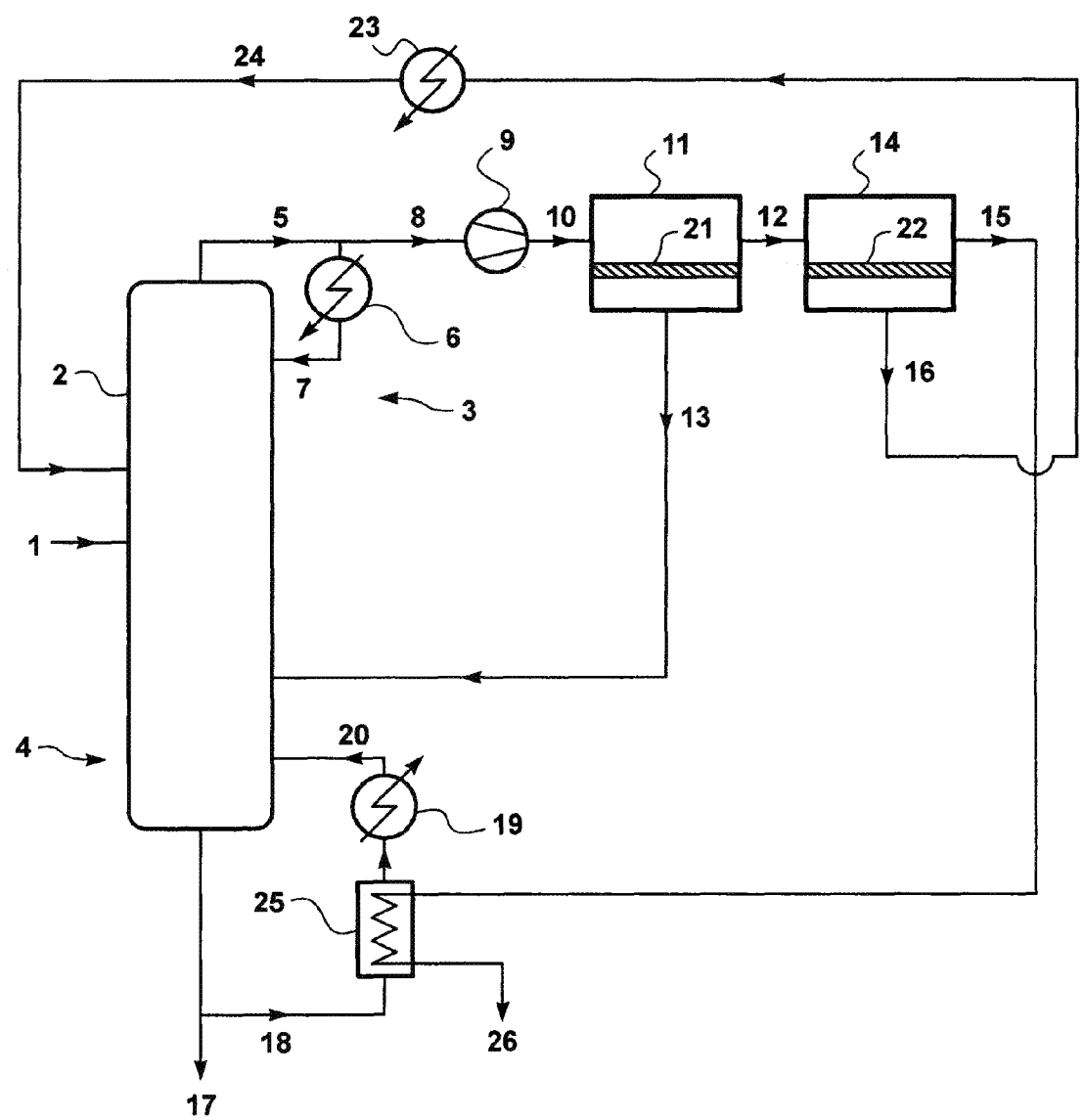
FIG. 4 is a schematic drawing showing an embodiment of the invention in which the second permeate stream is condensed and returned as liquid to the distillation step and the second residue vapor stream is brought into heat exchanging contact with the reboiler stream from the base of the stripping section.

A particularly preferred design that incorporates the features of both the embodiment of FIG. 2 and the embodiment of FIG. 3 is shown in FIG. 4. Referring to this figure, the second permeate stream, 16, is withdrawn as a vapor from the second membrane separation step and is passed through condenser, 23, where it is condensed to form liquid recycle stream, 24. This stream is returned to the rectification section of column, 2.

The second residue stream, 15, is withdrawn as a vapor from the second membrane separation step and is passed through heat exchanger or step, 25, in heat exchanging relationship with reboiler stream, 18. The resulting condensed product is withdrawn from the process as stream, 26.

Figure 5:
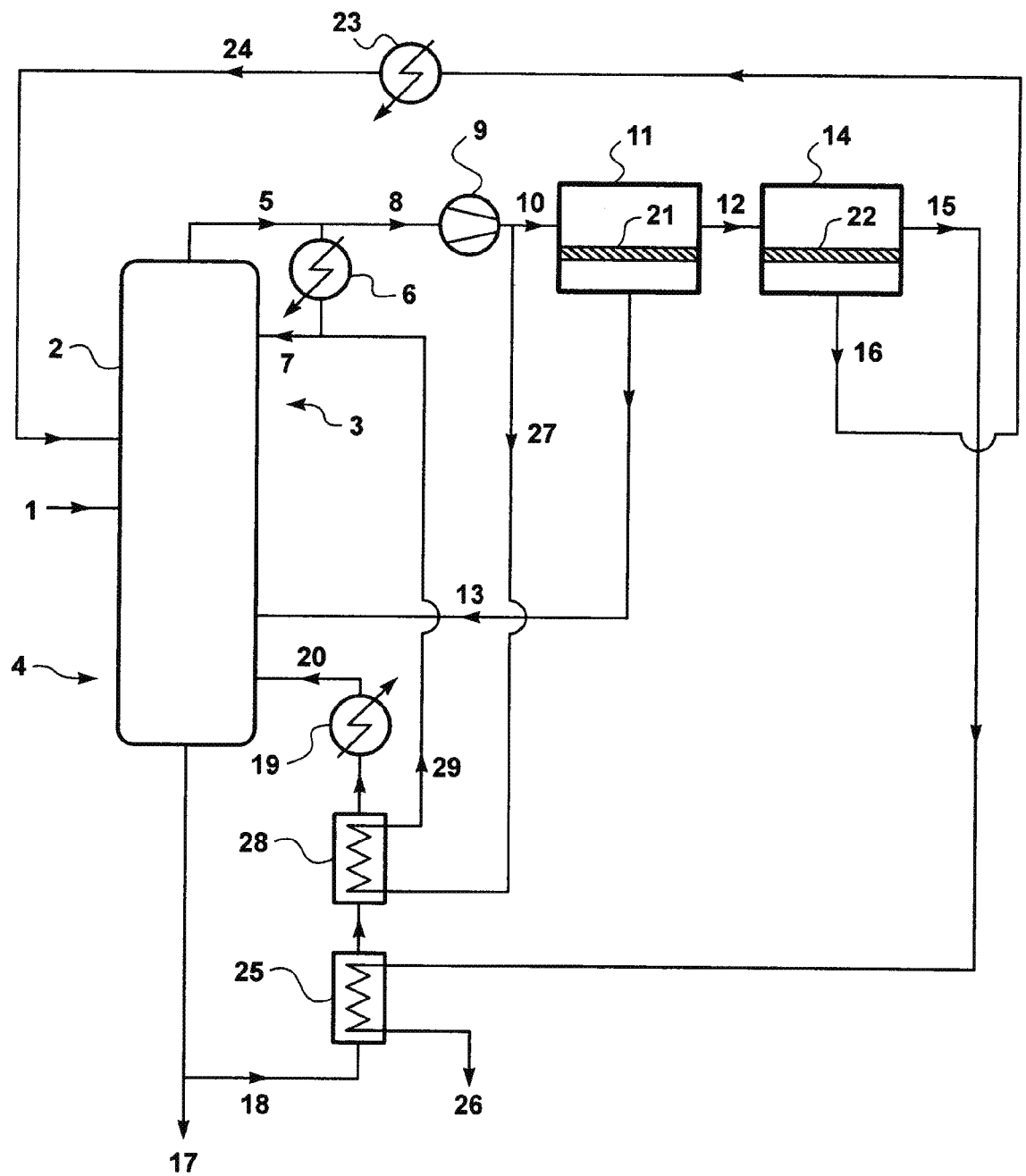
FIG. 5 is a schematic drawing showing an embodiment of the invention in which a first portion of the compressed overhead vapor stream is brought into heat-exchanging contact with the reboiler stream, and a second portion is passed to the membrane separation steps.

In the designs described above, all of the compressed overhead vapor is sent to the first membrane separation step. An optional alternative, in which part of the compressed stream is used for heat recovery, is shown in FIG. 5.

In this design, the size of the compressor unit is increased, compared to FIGS. 1-4, so that a bigger fraction of vapor leaving the column is compressed and only a small amount of the overhead vapor is sent to the rectifier column condenser. The compressed vapor stream is divided into two fractions. One fraction, stream 10, is sent to the membrane separation system as shown in FIGS. 1-4. The second fraction, stream 27, is heat exchanged in heat exchanger, 28, against reboiler stream, 18, to recover the latent heat of condensation.

The condensed liquid is then recycled to the rectifier column as reflux stream, 29. Therefore, the latent heat of condensation of this part of the reflux, which was formerly lost in the overhead condenser, is now recovered in the reboiler. Extra power is needed in the compressor, but the recovered latent heat is much larger in Btu value than the energy required to operate the compressor.

In this embodiment, it is sometimes possible to use the conventional reflux condenser and steam heater for the reboiler only during start-up. During regular operations, the column can be run solely on the recovered heat from internal working streams.

Figure 8:
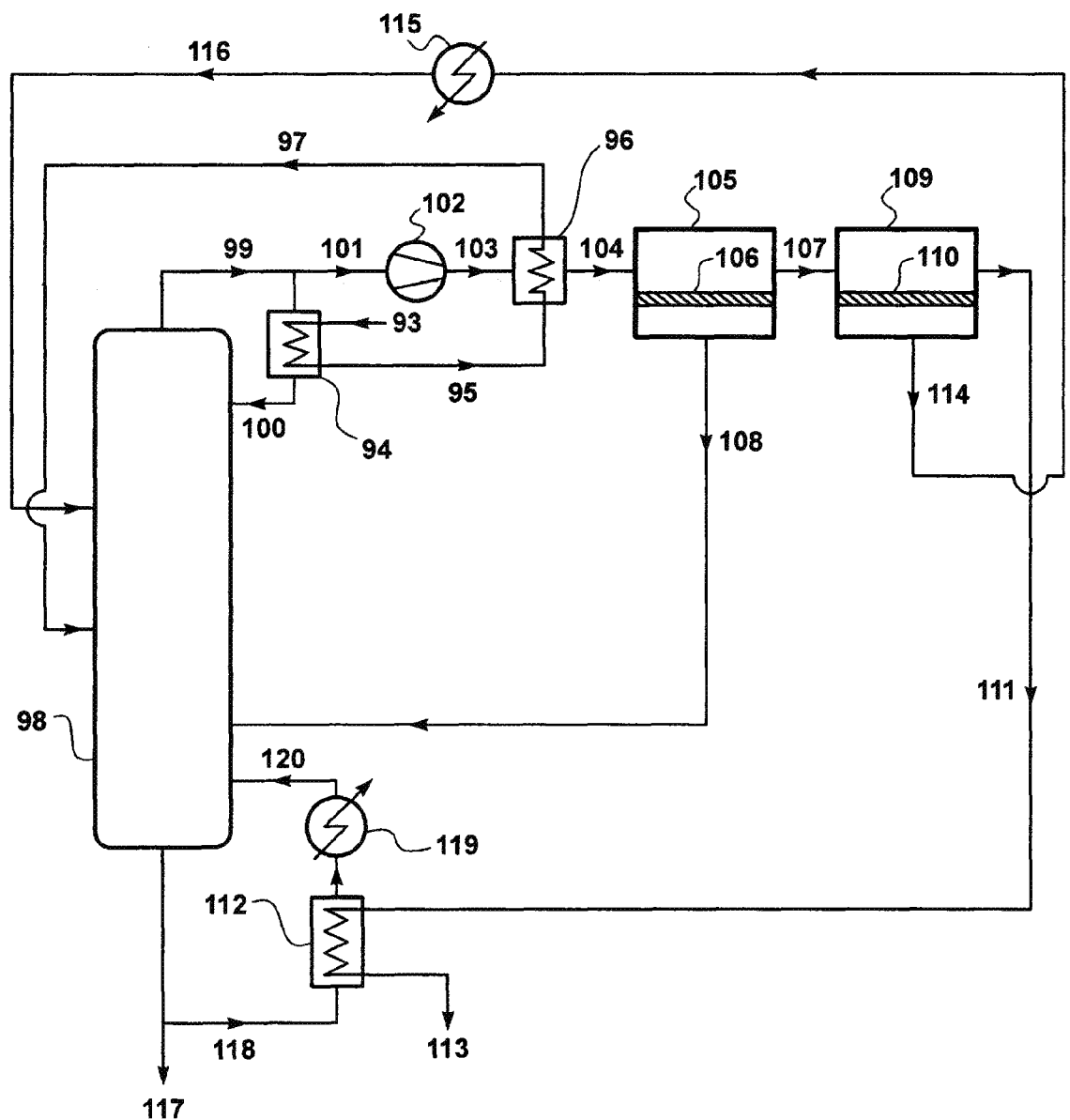
FIG. 8 is a schematic drawing of an embodiment of the invention that incorporates condensation/recycle of the second permeate stream, condensation of the product residue stream in the reboiler, and heat exchange between the incoming cool feed stream and the hot overhead and compressed overhead streams from the column.

Yet another option to take advantage of heat recovery from the hot overhead stream is to use it to warm the incoming feed stream. This option is illustrated in FIG. 8 and explained in the Examples section below.

Figure 6:
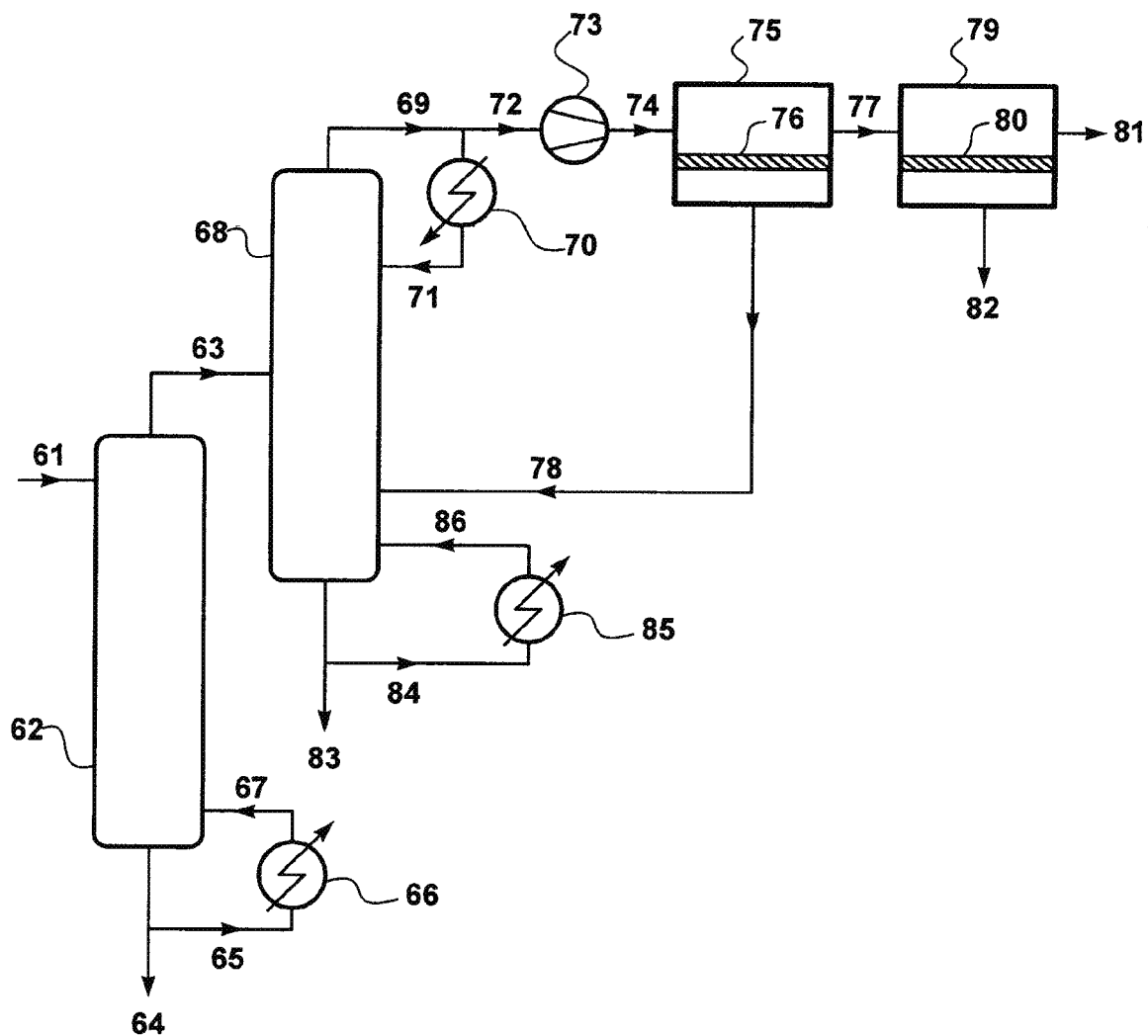
FIG. 6 is a schematic drawing showing an embodiment of the invention in which the distillation step is carried out in separate stripping and rectification columns.

The invention has been described so far with the stripping and rectification operations taking place in one distillation column. It is also possible within the scope of the invention to separate the stripping and rectification functions into separate columns, as shown in FIG. 6.

Referring to this figure, feed stream, 61, enters stripping column, 62. The column produces an overhead vapor stream, 63, and a bottoms stream, 64. A portion of the bottoms stream forms reboiler stream, 65, which is heated, 66, and vaporized by heat exchange against one or more process streams, as described above, or by steam or other heating. The hot vapor stream, 67, returns to the column.

Overhead vapor stream, 63, is passed as feed to rectification column, 68. This column produces an overhead vapor stream, 69, a portion of which forms reflux stream, 71, which is condensed in condenser, 70. The column also includes a reboiler, 85, where a portion, 84, of the bottoms stream, 83, is vaporized for return to the column as stream, 86.

The rectified overhead vapor stream, 72, is compressed in compressor, 73, and passes as feed vapor stream, 74, to first membrane separation unit 75, containing water-selective membranes, 76. This step operates as described for the other embodiments above, to produce first residue stream, 77, and first permeate stream, 78. The permeate stream is returned for heat recovery to either column, depending on its composition.

The first residue stream passes as feed to second membrane separation step, 79, containing water-selective membranes, 80. This step also operates as described previously to produce dehydrated product stream, 81, and second permeate vapor stream, 82. Both streams 81 and 82 may optionally be used as described with respect to FIGS. 1-4 for heat recovery.

Embodiments of this type are particularly useful in cases where the stripper can operate to produce an overhead vapor with a solvent concentration of about 30 or 40 wt %. Feeding a stream of such concentration directly to the membrane separation steps without rectification is not preferred, especially if a high-purity solvent product is desired, because the membrane area and compressor horsepower required may be large.

On the other hand, a modest amount of rectification, using a short column having, for example, fewer than 10 separation stages, such as 4 or 6 stages, can bring the solvent concentration up to 70 or 80 wt %. Such a stream can be processed using modest compressor power and membrane area to yield a high-purity product.

Figure 7:
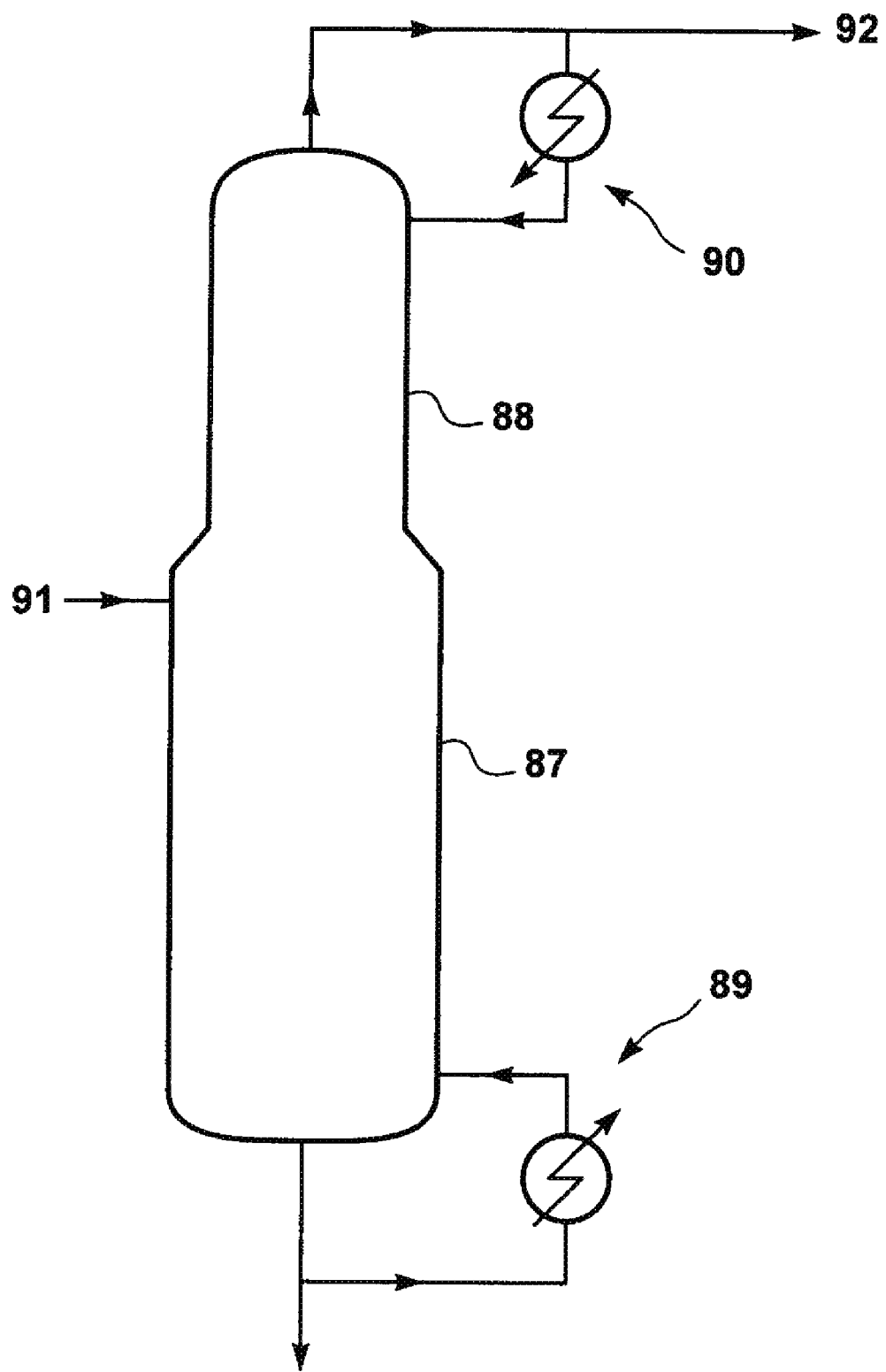
FIG. 7 is a schematic drawing of a column in which a small rectification column is mounted on top of a stripping column.

As another alternative in this case, the rectifier may be fitted as a short section on top of the stripping column, as shown in FIG. 7. In this figure, a relatively short rectifier, 88, having up to about 10 separation stages, and a reflux condenser, 90, is mounted on a stripping column, 87, having a reboiler, 89. To use this type of column in the processes of the invention, raw feed is introduced as stream 91 at the top of the stripping column, and rectified overhead stream, 92, passes to the membrane separation steps.

Designs of the types described above are particularly useful in the production of bioethanol. The stripping column of the present invention is then comparable in function to the beer still of prior art processes.

Depending on the composition of the feed stream and the desired purity of the product, the process variables in any of the embodiments above can be adjusted to provide a highly cost and energy efficient process.

One aspect is to adjust the proportions of the separation performed by the column and by the membrane separation steps. Most of the membranes identified above as suitable to perform the separation offer high water/solvent selectivity and high water permeability. As demonstrated in the examples section below, we have found that processes that combine low energy input with low cost for the integrated process tend to occur if the column is used to raise the solvent concentration to at least about 70 wt % solvent, but no more than about 90 wt % solvent, and the membrane separation steps are used to increase the purity of the product to the desired level, such as 98+ wt % or 99+ wt % solvent.

The balance between how much separation is done by the column and how much by the membrane unit depends on the balance between operating cost (principally the cost of energy used in the process) and capital cost of the equipment needed. In general, using a large stripping column and a large compressor/membrane unit will have the lowest energy cost but the highest capital cost. Adding a few trays of rectification to the stripping column increases the total energy consumption but will significantly reduce the size of the compressor and the membrane unit.

As the separation achieved by the distillation column tends to the maximum (such as when the azeotrope is approached in an ethanol/water system), escalating energy costs for operation outweigh the benefit of the capital savings for the compressor and membrane units.

For ethanol/water mixtures, for example, the preferred balance is achieved if the distillation column produces an overhead stream containing about 70-80 wt % ethanol. If the ethanol concentration in the feed being sent to the column is low, for example 3-5 wt % ethanol, the preferred balance may be achieved with a lower overhead concentration in the column, such as 60 wt % ethanol or even lower.

The invention is now further described by the following examples, which are intended to be illustrative of the invention, but are not intended to limit the scope or underlying principles in any way.

EXAMPLES

Example 1

A computer calculation was performed with a modeling program, ChemCad 5.5.1 (ChemStations, Inc., Houston, Tex.), to illustrate the process of the invention in the embodiment shown in FIG. 1.

The calculations assumed that the feed composition to the distillation column was 11.5 wt % ethanol and 88.5 wt % water, representative of a raw feed from a bioethanol manufacturing process, and that the feed was introduced at tray 6 to a column having 25 separation stages. The column was assumed to operate-under a vacuum of 0.5 bar. The process was configured to provide a rectified overhead stream, 8, containing about 80 wt % ethanol, and a dehydrated product stream, 15, containing 99.7 wt % ethanol. The membranes in both steps were assumed to have a selectivity for water over ethanol of about 50, and a water permeance of 2,500 gpu, as is consistent with the membranes described in co-owned and copending patent application Ser. Nos. 11/715,245 and 11/897,675, for example.

The results of the calculations are summarized in Table 1.

TABLE 1

| | Stream number | | | | | |
|---|---|---|---|---|---|---|
| | 1 (Feed) | 8 (Rectified overhead) | 12 | 13 | 15 (Product ethanol) | 16 | 17 |
| Flow (thousand kg/h) | 165 | 24.4 | 20.9 | 3.5 | 16.6 | 4.3 | 144 |
| Temp (EC) | 37 | 64 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

In the configuration of FIG. 1, the permeate stream, 13, from the first membrane separation step, containing about 20 wt % ethanol, is returned to the lower portion of the column at about the tray 18 or 19 position. The process was found to require about 1,200 m² of membrane area for the first membrane separation step and 2,900 m² for the second step. The reboiler requires a heat input of about 64.1 million Btu/h. The energy consumption of the compressor was calculated at 1,080 kW-h.

For this and the other examples, we assumed that 1 kW-h is equivalent to 10,000 Btu/h. This conversion effectively multiplies the energy consumption of the compressor by a factor of 3 to take into account the inefficiency of converting heat to electric power. The conversion gives an energy input for the compressor of 10.8 million Btu/h. Thus, the total energy input required for the process is about 74.9 million Btu/h.

Example 2

A computer calculation was performed using the same basic assumptions as in Example 1 to illustrate the process of the invention in the embodiment shown in FIG. 2. This embodiment differs from that of FIG. 1 in that the permeate from the second membrane separation step is condensed and returned as a liquid to the upper portion of the column, thereby contributing to the reflux in the column.

The results of the calculations are summarized in Table 2.

TABLE 2

| | Stream number | | | | | |
|---|---|---|---|---|---|---|
| | 1 (Feed) | 8 (Rectified overhead) | 12 | 13 | 15 (Product ethanol) | 16 | 17 |
| Flow (thousand kg/h) | 165 | 27.7 | 23.8 | 3.9 | 18.9 | 4.9 | 146 |
| Temp (EC) | 37 | 64 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

In this example, both permeate streams are recycled; the first permeate stream, 13, is sent to the column as vapor to tray 22; the second permeate stream, 16, containing about 53 wt % ethanol, is returned as liquid reflux in the rectification section of the column at about the tray 7 or 8 position.

To operate the process in this configuration uses about 1,100 m² of membrane area for the first membrane separation step and 3,350 m² for the second step. The reboiler requires about 64.1 million Btu/h and the compressor requires about 12.3 million Btu/h, which means that the total energy required for the process is 76.4 million Btu/h.

The ethanol recovery increases by 2,300 kg/h compared with the calculation of Example 1, from 16,600 kg/h to 18,900 kg/h.

Example 3

A computer calculation was performed using the same basic assumptions as in Example 1 to illustrate the process of the invention in the embodiment shown in FIG. 3. This embodiment differs from that of FIG. 1 in that the dehydrated residue product stream, 15, from the second membrane separation step is condensed in the reboiler to provide some of the heat necessary to operate the reboiler.

The results of the calculations are summarized in Table 3.

TABLE 3

| | Stream number | | | | | |
|---|---|---|---|---|---|---|
| | 1 (Feed) | 8 (Rectified overhead) | 12 | 13 | 15 (Product ethanol) | 16 | 17 |
| Flow (thousand kg/h) | 165 | 24.4 | 20.9 | 3.5 | 16.6 | 4.3 | 144 |

TABLE 3-continued

| | Stream number | | | | | |
|---|---|---|---|---|---|---|
| | 1 (Feed) | 8 (Rectified overhead) | 12 | 13 | 15 (Product ethanol) | 16 | 17 |
| Temp (EC) | 37 | 64 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

As can be seen, the separation results of Table 3 are identical to Example 1, and the total energy requirement for the process is 74.9 million Btu/h.

However, condensation of stream 15 in the reboiler recovers about 13.6 million Btu/h of latent heat, reducing the amount of external energy required to operate the process to about 61.3 million Btu/h.

Example 4

A computer calculation was performed using the same basic assumptions as in Example 1 to illustrate the process of the invention in the embodiment shown in FIG. 4. This embodiment incorporates both condensation/recycle of the second permeate stream and condensation of the product residue stream in the reboiler.

The results of the calculations are summarized in Table 4.

TABLE 4

| | Stream number | | | | | | |
|---|---|---|---|---|---|---|---|
| | 1 (Feed) | 8 (Rectified overhead) | 12 | 13 | 15 (Product ethanol) | 16 | 17 |
| Flow (thousand kg/h) | 165 | 27.7 | 23.8 | 3.9 | 18.9 | 4.9 | 146 |
| Temp (EC) | 37 | 64 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

As can be seen, the separation results of Table 4 are identical to Example 2, and the total energy requirement for the process is 76.4 million Btu/h.

However, recovering the latent heat from the second residue stream saves about 15.5 million Btu/h, reducing the amount of external energy required to operate the process to about 60.9 million Btu/h.

Example 5

A computer calculation was performed to illustrate the process of the invention as shown in FIG. 8. This embodiment incorporates condensation/recycle of the second permeate stream, condensation of the product residue stream in the reboiler, and heat exchange between the incoming cool feed stream and the hot overhead and compressed overhead streams from the column.

Referring to FIG. 8, feed stream, 93, enters the process by passing through heat exchanger, 94, in heat-exchanging relationship against reflux stream, 100. The heated feed stream, 95, is further warmed by passing through heat exchanger, 96, which acts as an after-cooler for compressor, 102. The heated feed, stream 97, now passes into column, 98.

Overhead vapor stream, 99, is withdrawn from the column. A portion of this stream is sent to condensing heat exchanger 94 and returns to the column as liquid reflux stream 100. Rectified vapor stream, 101, is passed to vapor compressor or compression step, 102. The compressed overhead vapor stream, 103, is cooled in aftercooler/heat exchanger 96, and is introduced as feed stream, 104, into first membrane separation unit or step, 105, containing membranes, 106.

First permeate stream, 108, in withdrawn from the first membrane separation step in vapor form and returned to the distillation column. First residue stream, 107, is passed as feed to second membrane separation unit, 109, containing membranes, 110.

The second membrane separation step produces a second residue vapor stream, 111. This stream is passed through reboiler heat exchanger, 112, in heat-exchanging relationship against reboiler stream, 118, and is withdrawn as product stream, 113. Reboiler stream 118 also passes through reboiler heater, 119, and is returned to the column as vapor stream, 120.

Bottoms stream, 117, is withdrawn from the base of the column.

The second membrane separation step also produces second water-enriched permeate stream, 114. This stream is condensed in cooling/condensing step, 115, and returned as liquid stream, 116, to the column.

The results of the calculation are shown in Table 5. As can be seen, the separation performance results are identical to Examples 2 and 4.

In this case, the heat input for the reboiler is reduced to 50.5 million Btu/h by heating the feed by heat exchange before it enters the column. The compressor requires about 12.3 million Btu/h, but as in Examples 2 and 4, latent heat recovered from the second residue stream saves about 15.5 million Btu/h.

In this embodiment, the total net heat input is reduced to 47.3 million Btu/h.

TABLE 5

| | Stream number | | | | | | |
|---|---|---|---|---|---|---|---|
| | 93 (Feed) | 101 (Rectified overhead) | 107 | 108 | 113 (Product ethanol) | 114 | 117 |
| Flow (thousand kg/h) | 165 | 27.7 | 23.8 | 3.9 | 18.9 | 4.9 | 146 |
| Temp (EC) | 37 | 64 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

Examples 6-8

Comparative Set of Calculations

Example 6

Not in Accordance with the Invention

Figure 9:
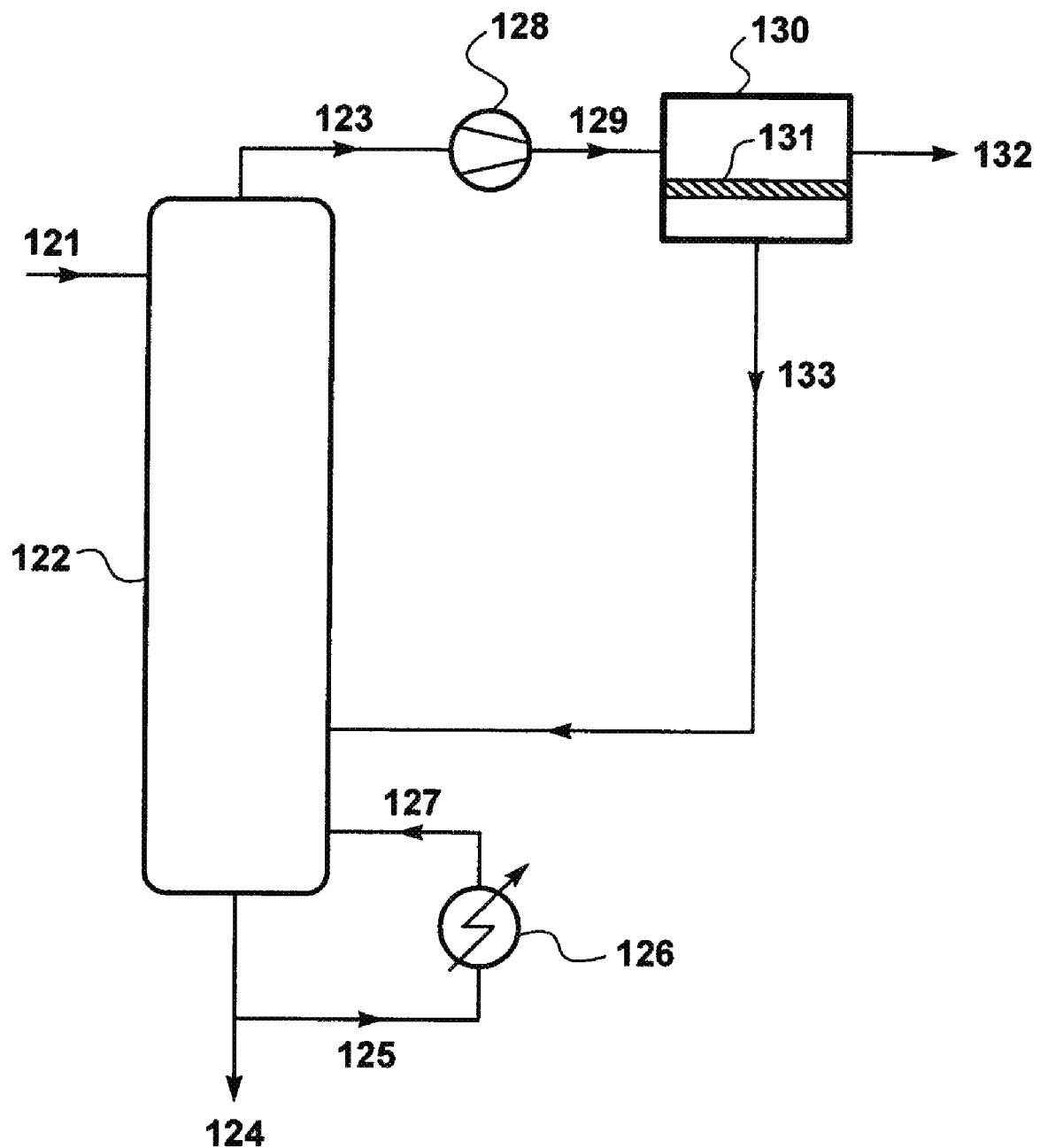
FIG. 9 (not in accordance with the invention) shows a design in which the overhead from a stripping column is treated in one membrane separation step.

A computer calculation was performed to compare the processes of the invention with the process described in Japanese Published Application number JP7227517, which is shown in FIG. 9. This process uses a membrane separation step to treat the overhead from a stripping column.

Referring to FIG. 9, feed stream, 121, enters stripping column 122, where it is separated into overhead vapor stream, 123, and bottoms stream, 124. A portion of the bottoms stream is taken as reboil stream, 125, which passes through reboiler, 126, and is returned to the column as hot vapor stream, 127.

The overhead stream is compressed in compressor, 128, to form compressed vapor stream, 129, which passes as feed to membrane separation step, 130, which is operated using membranes, 131, that are selective in favor of water over ethanol or other organic solvent. Dehydrated ethanol stream, 132, is withdrawn as the residue stream from the membrane; permeate stream, 133, is withdrawn and returned to the stripping column at tray 15.

The calculations assumed that the feed composition to the column was 11.5 wt % ethanol and 88.5 wt % water. As before, the membranes in both steps were assumed to have a selectivity for water over ethanol of about 50, and the column was assumed to operate under a vacuum of 0.5 bar. The compressor was assumed to compress the overhead vapor to 3 bar. The process was configured to provide a product stream containing 99.7 wt % ethanol.

It was assumed that the product stream was condensed by heat exchange in the reboiler, thereby providing some of the reboiler energy needs.

The results of the calculations are summarized in Table 6.

TABLE 6

| | Stream | | | | |
|---|---|---|---|---|---|
| | 121 (Feed) | 123 (Overhead vapor) | 124 | 132 (Product ethanol) | 133 |
| Flow (thousand kg/h) | 165 | 66.0 | 146 | 18.9 | 47.1 |
| Temp (EC) | 50 | 73 | 81 | 117 | 123 |
| Pressure (bar) | 1.0 | 0.5 | 0.5 | 3.0 | 0.5 |
| Composition (wt %) | | | | | |
| Water | 88.5 | 46.0 | 99.9 | 0.3 | 64.3 |
| Ethanol | 11.5 | 54.0 | 0.1 | 99.7 | 35.7 |

The membrane area used to perform the separation was calculated to be 26,460 m$^2$.

The energy usage of the process was 26.8 MMBtu/h for the reboiler and 40.8 MMBtu/h for the compressor, or 67.6 MMBtu/h overall.

Example 7

Not in Accordance with the Invention

Figure 10:
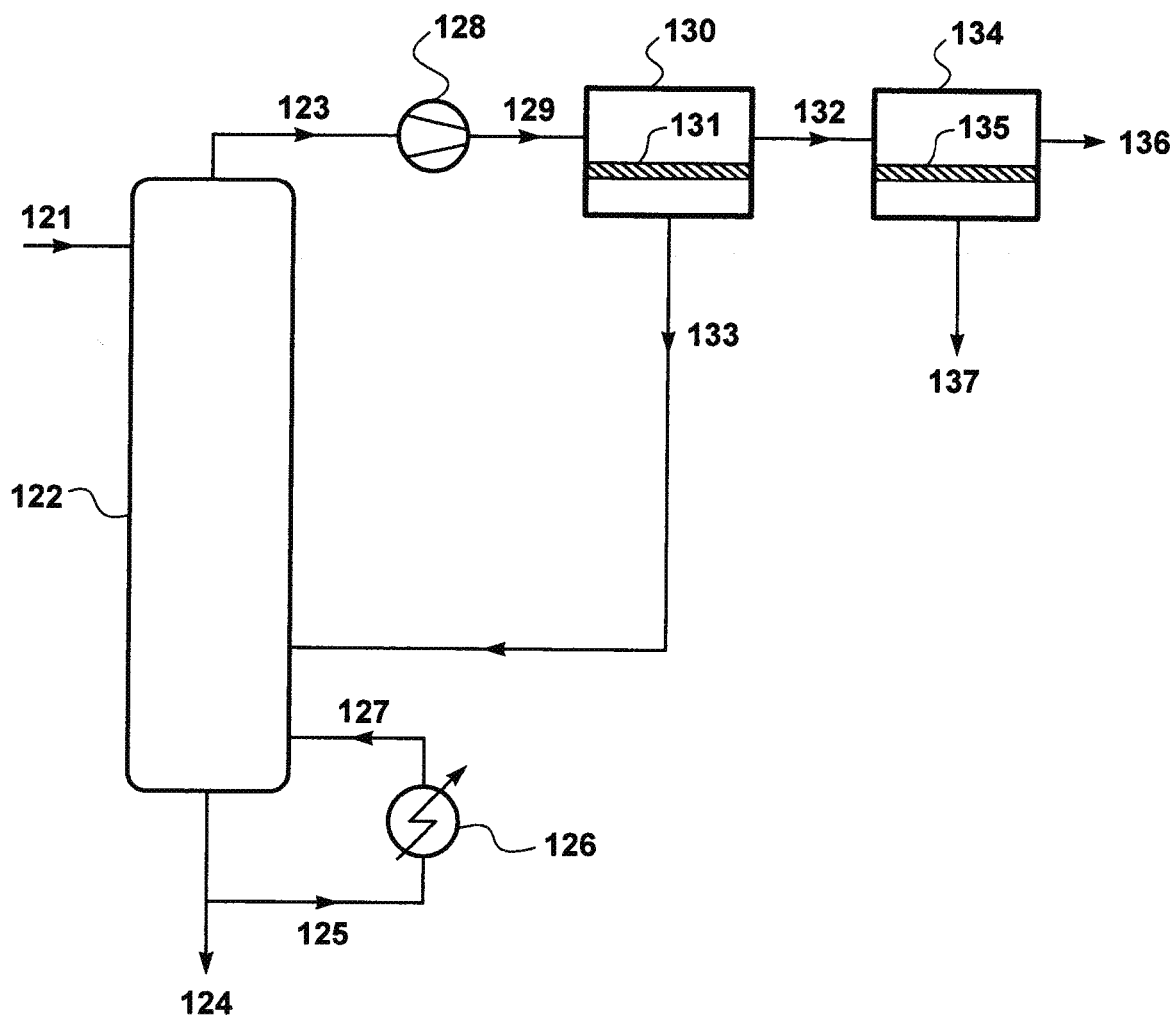
FIG. 10 (not in accordance with the invention) shows a design in which the overhead from a stripping column is treated in two membrane separation steps.

The calculation of Example 6 was repeated, except that this time two membrane separation steps were assumed to be used, as shown in FIG. 10, in which like elements are numbered as in FIG. 9. Referring to FIG. 10, first residue stream, 132, is passed as feed to a second membrane separation step, 134, that is carried out using water-selective membranes, 135. The membrane separates the stream into a dehydrated product stream, 136, and a second permeate stream, 137.

The membranes used in this step were assumed to have a water/ethanol selectivity of 50, and the pressure on the permeate side of the second membrane separation step was assumed to be 0.1 bar, achieved by cooling the permeate stream. Other assumptions were as Example 6.

The results of the calculations are summarized in Table 7.

TABLE 7

| | Stream | | | | | |
|---|---|---|---|---|---|---|
| | 121 (Feed) | 123 (Overhead vapor) | 124 | 133 | 136 (Product ethanol) | 137 |
| Flow (thousand kg/h) | 165 | 32.9 | 144 | 12.0 | 16.6 | 4.3 |
| Temp (EC) | 50 | 71 | 81 | 123 | 30 | 119 |
| Pressure (bar) | 1.0 | 0.5 | 0.5 | 0.5 | 3.0 | 0.1 |
| Composition (wt %) | | | | | | |
| Water | 88.5 | 39.0 | 99.9 | 89.7 | 0.3 | 47.1 |
| Ethanol | 11.5 | 61.0 | 0.1 | 10.3 | 99.7 | 52.9 |

The membrane area used to perform the separation was calculated to be 5,525 m$^2$.

The energy usage of the process was 24.1 MMBtu/h for the reboiler and 18.8 MMBtu/h for the compressor, or 42.9 MMBtu/h overall.

Example 8

In Accordance with the Invention

The calculation of Example 7 was repeated, except that this time the column was assumed to have rectifying capability, so that the process is the process of the invention as shown in FIG. 1. The assumptions regarding membranes properties and operating pressures for the equipment were the same as in Example 7.

The results of the calculations are summarized in Table 8.

TABLE 8

| | Stream | | | | | | |
|---|---|---|---|---|---|---|---|
| | 1 (Feed) | 8 (Overhead vapor) | 12 | 13 | 15 (Product ethanol) | 16 | 17 |
| Flow (thousand kg/h) | 165 | 24.4 | 20.9 | 3.5 | 16.6 | 4.3 | 144 |
| Temp (EC) | 50 | 63 | 115 | 116 | 112 | 113 | 81 |
| Pressure (bar) | 1.0 | 0.5 | 3.0 | 0.5 | 3.0 | 0.1 | 0.5 |
| Composition (wt %) | | | | | | | |
| Water | 88.5 | 20.0 | 9.9 | 80.6 | 0.3 | 47.1 | 99.9 |
| Ethanol | 11.5 | 80.0 | 90.1 | 19.4 | 99.7 | 52.9 | 0.1 |

The membrane area used to perform the separation was calculated to be 4,126 m$^2$.

The second permeate stream is not recycled in this basic configuration, so some amount of ethanol will be lost to the second permeate stream. Without recycle, the second permeate stream loses 2,275 kg/h of ethanol from the process.

The energy usage of the process was 45.0 MMBtu/h for the reboiler and 10.8 MMBtu/h for the compressor, or 55.8 MMBtu/h overall.

The energy usage and membrane area requirements for the calculation set are summarized in Table 9.

TABLE 9

| Example number | 6 | 7 | 8 |
|---|---|---|---|
| Energy usage for reboiler (MMBtu/h) | 26.8 | 24.1 | 45.0 |
| Energy usage for compressor (MMBtu/h) | 40.8 | 18.8 | 10.8 |
| Energy usage, total (MMBtu/h) | 67.6 | 42.9 | 55.8 |
| Membrane area (m$^2$) | 26,460 | 5,525 | 4,126 |

As can be seen, the lowest energy requirement is for the process using two membrane separation steps in conjunction with a stripping column. The lowest energy requirement for the compressor, however, is for the process of the invention, which also uses the least membrane area.

Example 9

Another calculation was performed to model the process of the invention according to the embodiment shown of FIG. 1. The assumptions were as in Example 8, except that the second permeate stream was assumed to be chilled to produce a lower pressure of 0.05 bar on the permeate side of the second membrane unit, thereby increasing the pressure ratio for the second membrane separation step to 3/0.05, or 60.

The results are shown in Table 10.

TABLE 10

| | Stream | | | | | |
|---|---|---|---|---|---|---|
| | 1 (Feed) | 8 (Rectified overhead) | 12 | 13 | 15 (Product ethanol) | 16 | 17 |
| Flow (thousand kg/h) | 165 | 24.4 | 20.9 | 3.5 | 17.1 | 3.8 | 144 |
| Temp (EC) | 50 | 64 | 115 | 116 | 112 | 114 | 81 |
| Pressure (bar) | 1.0 | 0.5 | 3.0 | 0.5 | 3.0 | 0.05 | 0.5 |
| Composition (wt %) | | | | | | | |
| Water | 88.5 | 20.0 | 9.9 | 80.6 | 0.3 | 53.8 | 99.9 |
| Ethanol | 11.5 | 80.0 | 90.1 | 19.4 | 99.7 | 46.2 | 0.1 |

The membrane area used to perform the separation was calculated to be 3,426 m$^2$. The use of a higher pressure ratio in the second membrane separation step allowed fuller use of the membrane selectivity in this step, reducing overall membrane area needed substantially.

Without recycle, the second permeate stream loses 1,755 kg/h of ethanol from the process.

Example 10

The calculation of Example 9 was modified by increasing the selectivity of the second membrane to 250. The higher selectivity was assumed to be reflected in a water permeance of 2,500 gpu, as in other calculations, but a reduced ethanol permeance of only 10 gpu.

The ChemCad calculations were repeated taking into account the increased selectivity. The results are shown in Table 11.

TABLE 11

| | Stream | | | | | |
|---|---|---|---|---|---|---|
| | 1 (Feed) | 8 (Rectified overhead) | 12 | 13 | 15 (Product ethanol) | 16 | 17 |
| Flow (thousand kg/h) | 165 | 24.4 | 20.9 | 3.5 | 18.4 | 2.5 | 144 |
| Temp (EC) | 50 | 64 | 115 | 116 | 114 | 114 | 81 |
| Pressure (bar) | 1.0 | 0.5 | 3.0 | 0.5 | 3.0 | 0.05 | 0.5 |
| Composition (wt %) | | | | | | | |
| Water | 88.5 | 20.0 | 9.9 | 80.6 | 0.3 | 80.6 | 99.9 |
| Ethanol | 11.5 | 80.0 | 90.1 | 19.4 | 99.7 | 19.4 | 0.1 |

The membrane area used to perform the separation was calculated to be 4,278 m$^2$.

Without recycle, the second permeate stream loses 485 kg/h of ethanol from the process.

A comparison of the results of Examples 8, 9, and 10 is given in Table 12. As can be seen, increasing the selectivity from 50 to 250 increases the membrane area needed to perform the separation substantially, because the permeation rate of the slower permeating component is now so slow. However, for a separation in which the second permeate is not to be recycled within the process, this design results in the least ethanol loss.

The lowest membrane area is achieved when the pressure ratio and selectivity are about the same numerically. This design is not pressure-ratio limited, so benefits in full from the available membrane selectivity.

These calculations show that, in many cases and especially when the second permeate stream is recirculated within the process, a very high membrane selectivity is not needed, and may even be disadvantageous.

TABLE 12

| Example number | 8 | 9 | 10 |
|---|---|---|---|
| Selectivity water/ethanol | 50 | 50 | 250 |
| Pressure ratio in second membrane step | 30 | 60 | 60 |
| Total membrane area (m$^2$) | 4,126 | 3,426 | 4,278 |
| Ethanol loss in second permeate (kg/h) | 2,275 | 1,755 | 485 |

Example 11

A set of calculations was performed to show how the relative proportions of the overall separation performed by the column and the membrane separation affect process attributes. In particular, a comparison was made between the total energy consumed, the membrane area used, and the compressor capacity needed to make 99.7 wt % ethanol from a feed of 165,000 kg/h containing 11.5 wt % ethanol. The compressor is typically the single most expensive equipment unit, so capital costs tend to scale with the size of compressor needed.

The process design was assumed to be as in FIG. 4. As in the previous calculations, the column was assumed to be operated at 0.5 bar pressure, and the rectified column overhead was assumed to be compressed to 3 bar before entering the first membrane separation step.

The first membrane separation step was assumed to use membranes having a selectivity in favor of water over ethanol of about 80 and the second step was assumed to use membranes having a higher selectivity of about 170, values that are consistent with the membranes described in co-owned and copending patent application Ser. Nos. 11/715,245 and 11/897,675, for example. The second membrane separation step was assumed to operate at 0.1 bar on the permeate side.

The first calculation (not in accordance with the invention) assumed that the column has only stripping capability. In this case, under the process conditions, the maximum ethanol concentration that can be reached in the column overhead is about 63 wt % ethanol, and the membrane steps raise the concentration from 62.7 wt % to 99.7 wt %.

The calculation was repeated by gradually increasing the degree of rectification in the column until the column was producing an overhead stream containing 90 wt % ethanol. Above this value, the energy requirements to operate the column become unrealistically high.

Figure 11:
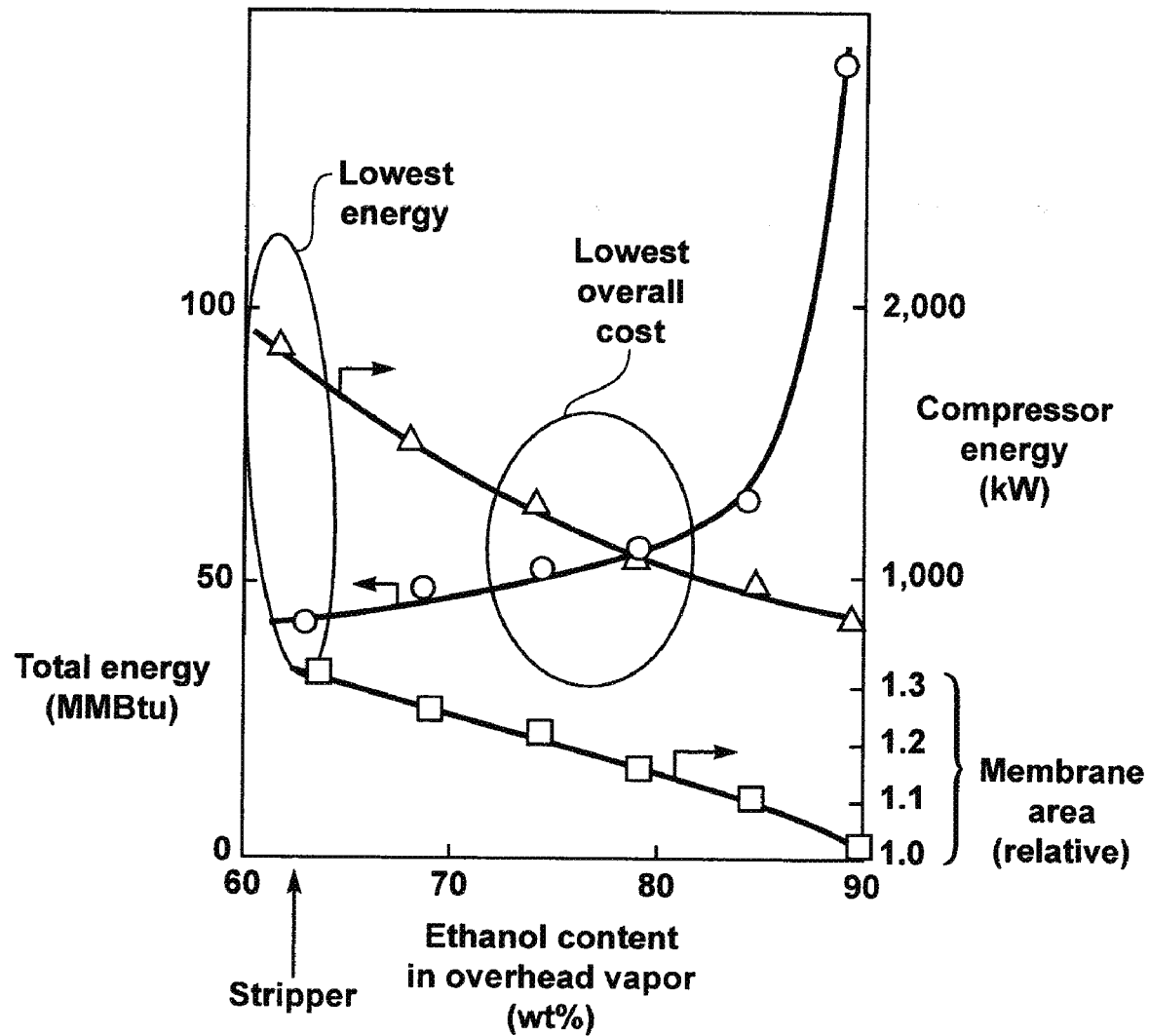
FIG. 11 is a graph comparing total energy consumed, the membrane area used, and compressor capacity needed for processes in which different proportions of the total separation are performed by the distillation column and the membrane separation steps.

The results are summarized in Table 13 and plotted in FIG. 11, where membrane area is shown as a fractional increase over the lowest membrane area case (90 wt % ethanol in overhead).

TABLE 13

| Column overhead ethanol concentration (wt %) | Compressor capacity (kW) | Total energy input (MMBtu/h) | Relative membrane area |
|---|---|---|---|
| 63 | 1,857 | 42.6 | 1.33 |
| 70 | 1,507 | 48.5 | 1.26 |
| 75 | 1,309 | 51.7 | 1.21 |
| 80 | 1,137 | 54.8 | 1.16 |
| 85 | 987 | 63.2 | 1.10 |
| 90 | 852 | 161.7 | 1 |

As can be seen, the required compressor capacity and membrane area decrease as the concentration of ethanol in the column overhead increases, that is, as the column is performing more and more of the separation. At the same time, the total energy to operate the process increases.

Conversely, the energy required to operate the column decreases, but the membrane area and compressor energy needs increase as more of the separation is performed by the membranes.

The graph highlights a region of operation in which the operating costs (as represented by the total energy to operate the process) and the capital costs (as represented by the compressor capacity) are controlled to be within a moderate range.

We believe that this is the most preferred operating mode for the process, with the lowest overall combination of capital and operating costs.

By following the teachings above, the most preferred operating region for processes using other types of feeds, membranes of different properties, or different pressures and temperatures of operation can be determined.

Example 12

A set of calculations of the type described above was performed to illustrate the process of the invention in the embodiment of FIG. 5. In this embodiment, a portion of the compressed overhead stream is used for heat recovery, instead of being sent to the membrane separation steps.

This portion is heat exchanged in the column reboiler against the reboiler return stream to recover the latent heat of condensation. The resulting condensed liquid is recycled to the rectifier section as additional reflux.

As in the previous calculations, the column was assumed to be operated at 0.5 bar pressure, and the overhead was assumed to be compressed to 3 bar before entering the first membrane separation step. The first membrane separation step was assumed to use membranes having a selectivity in favor of water over ethanol of about 80 and the second step was assumed to use membranes having a higher selectivity of about 170, and to operate at 0.1 bar on the permeate side.

For each calculation in this set, the column was assumed to be operated to produce an overhead containing 80 wt % ethanol.

A representative calculation, in which 20 vol % of the compressed stream is sent to heat exchanger 28, is given in Table 14.

TABLE 14

| | Stream number | | | | | | | |
|---|---|---|---|---|---|---|---|---|
| | 1 (Feed) | 8 (Rectified overhead) | 10 (Membrane feed) | 27 (Portion to heat exch.) | 15 (Product ethanol) | 13 | 16 | 17 |
| Flow (thousand kg/h) | 165 | 32.0 | 25.6 | 6.4 | 18.9 | 3.4 | 3.3 | 146 |
| Temp (EC) | 50 | 64 | 116 | 164 | 113 | 116 | 114 | 81 |
| Pressure (bar) | 1.0 | 0.5 | 3.0 | 3.0 | 3.0 | 0.5 | 0.1 | 0.5 |
| Composition (wt %) | | | | | | | | |
| Water | 88.5 | 20.0 | 20.0 | 20.0 | 0.3 | 86.4 | 64.7 | 99.9 |
| Ethanol | 11.5 | 80.0 | 80.0 | 80.0 | 99.7 | 13.6 | 35.3 | 0.1 |

For this case, the reboiler requires about 58.9 million Btu/h. Of this 15.5 million Btu/h are provided by condensation of the product stream, 15, in heat exchanger 25, and 7.8 million Btu/h are provided by the portion of compressed overhead diverted to heat exchanger 28.

The energy needed for the compressor is 14.2 million Btu/h, so the net energy input to operate the process is 49.8 million Btu/h.

Figure 12:
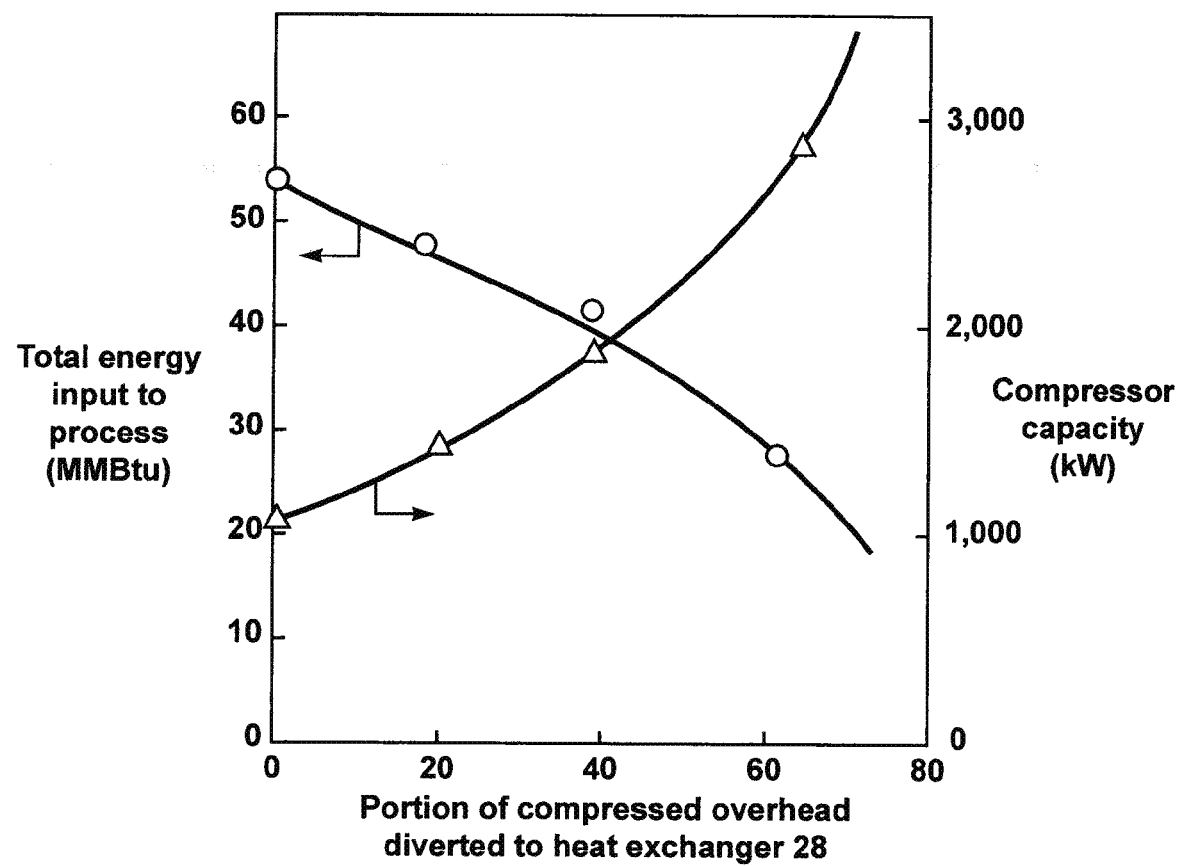
FIG. 12 is a graph comparing total energy consumed and compressor capacity needed for processes in which different proportions of the compressed overhead stream are used for heat recovery in the reboiler.

The calculation was repeated for the cases in which 40 vol % and 60 vol % of the compressed overhead are diverted to the compressor, as well as for a base case in which none of the compressed overhead is diverted. The results are summarized in Table 15 and FIG. 12.

TABLE 15

| Portion of compressed overhead diverted to heat exch. (vol %) | Compressor capacity (kW) | Total energy input (MMBtu/h) |
|---|---|---|
| 0 | 1,137 | 54.8 |
| 20 | 1,421 | 47.8 |

TABLE 15-continued

| Portion of compressed overhead diverted to heat exch. (vol %) | Compressor capacity (kW) | Total energy input (MMBtu/h) |
|---|---|---|
| 40 | 1,894 | 42.2 |
| 60 | 2,840 | 28.4 |

As with Example 11, there is a balance between low total energy usage and moderate compressor costs.

Example 13

A calculation was performed to illustrate the process of the invention in the embodiment of FIG. 4, as it relates to the treatment of a much larger feed stream containing only 1 wt % ethanol. Other assumptions were the same as in Example 11. The results of the calculation are shown in Table 16.

TABLE 16

| | Stream number | | | | |
|---|---|---|---|---|---|
| | 1 (Feed) | 8 (Rectified overhead) | 13 | 15 (Product ethanol) | 16 | 17 |
| Flow (thousand kg/h) | 1,508 | 18.5 | 2.4 | 13.6 | 2.4 | 1,495 |
| Temp (EC) | 37 | 64 | 124 | 121 | 123 | 81 |
| Pressure (bar) | 1.0 | 0.5 | 0.5 | 3.0 | 0.1 | 0.5 |
| Composition (wt %) | | | | | | |
| Water | 99.0 | 20.0 | 86.3 | 0.3 | 64.7 | 99.9 |
| Ethanol | 1.0 | 80.0 | 13.6 | 99.7 | 35.3 | 0.1 |

For this case, the net energy input needed is very high, at 279 million Btu/h. Nevertheless, the process can produce a high quality ethanol product from a very large, very dilute feed stream.

We claim:

1. A process for recovering an organic solvent from a solvent/water mixture, comprising:
    (a) subjecting the mixture to a distillation step comprising a stripping step performed in a stripping section and a rectification step performed in a rectification section, to produce a rectified vapor stream, enriched in organic solvent compared with the mixture, and a bottoms stream;
    (b) compressing at least a portion of the rectified vapor stream to form a compressed overhead vapor stream;
    (c) performing a first membrane separation step, comprising:
    (i) providing a first membrane having a first feed side and a first permeate side, the membrane being selective in favor of water over solvent;
    (ii) passing at least a portion of the compressed overhead vapor stream at a first feed pressure across the first feed side;
    (iii) maintaining a first permeate pressure on the first permeate side that is lower than the first feed pressure;
    (iv) withdrawing from the first feed side a first residue vapor stream enriched in solvent compared with the first compressed overhead vapor stream;
    (v) withdrawing from the first permeate side a first permeate stream enriched in water compared with the first compressed overhead vapor stream;
    (d) performing a second membrane separation step, comprising:
    (i) providing a second membrane having a second feed side and a second permeate side, the membrane being selective in favor of water over solvent;
    (ii) passing at least a portion of the first residue vapor stream at a second feed pressure across the second feed side;
    (iii) maintaining a second permeate pressure on the second permeate side that is lower than the second feed pressure;
    (iv) withdrawing from the second feed side a dehydrated solvent product;
    (v) withdrawing from the second permeate side a second permeate stream enriched in water compared with the first residue vapor stream;
    (e) recovering latent heat of condensation from the first permeate stream by returning the first permeate stream as a vapor to the stripping section.

2. The process of claim 1, wherein the second permeate pressure is lower than the first permeate pressure.

3. The process of claim 1, further comprising lowering the second permeate pressure by cooling and condensing the second permeate stream.

4. The process of claim 1, further comprising condensing the second permeate stream and returning it as liquid to the rectification section.

5. The process of claim 1, wherein latent heat of condensation is recovered from the second residue vapor stream by bringing the second residue vapor stream into heat exchanging contact with a reboiler stream from the stripping section.

6. The process of claim 1, wherein a first portion of the compressed overhead vapor stream is brought into heat exchanging contact with the reboiler stream, thereby recovering latent heat of condensation from the first portion, and a second portion of the compressed overhead vapor stream is passed across the first feed side in accordance with step (c) (ii).

7. The process of claim 1, wherein the stripping section and the rectification section are incorporated in a single distillation column.

8. The process of claim 1, wherein the stripping section and the rectification section are incorporated in separate stripping and rectification columns.

9. The process of claim 1, wherein the distillation step is operated in such a manner as to provide a solvent concentration in the range 75-85 wt % in the rectified vapor stream.

10. The process of claim 1, wherein the mixture has a solvent concentration below 15 wt %.

11. The process of claim 1, wherein the mixture has a solvent concentration below 6 wt %.

12. The process of claim 1, wherein the solvent is chosen from the group consisting of alcohols, aldehydes, ketones, esters and organic acids a having no more than six carbon atoms.

13. The process of claim 1, wherein the solvent comprises ethanol.

14. The process of claim 1, wherein the first membrane has a selectivity in favor of water over solvent of less than 100.

15. The process of claim 1, wherein a vacuum pump is used to lower the pressure on the first permeate side.

16. The process of claim 1, wherein step (e) is performed by returning the first permeate stream at a point where the permeate stream and an uprising vapor in the stripping section have about the same composition.

17. A process for recovering an organic ethanol from an ethanol/water mixture, comprising:
    (a) subjecting the mixture to a distillation step comprising a stripping step performed in a stripping section and a rectification step performed in a rectification section, to produce a rectified vapor stream, enriched in organic solvent compared with the mixture, and a bottoms stream;

(b) compressing at least a portion of the rectified vapor stream to form a compressed overhead vapor stream;

(c) performing a first membrane separation step, comprising:

(i) providing a first membrane having a first feed side and a first permeate side, the membrane being selective in favor of water over ethanol;

(ii) passing at least a portion of the compressed overhead vapor stream at a first feed pressure across the first feed side;

(iii) maintaining a first permeate pressure on the first permeate side that is lower than the first feed pressure;

(iv) withdrawing from the first feed side a first residue vapor stream enriched in ethanol compared with the first compressed overhead vapor stream;

(v) withdrawing from the first permeate side a first permeate stream enriched in water compared with the first compressed overhead vapor stream;

(d) performing a second membrane separation step, comprising:

(i) providing a second membrane having a second feed side and a second permeate side, the membrane being selective in favor of water over ethanol;

(ii) passing at least a portion of the first residue vapor stream at a second feed pressure across the second feed side;

(iii) maintaining a second permeate pressure on the second permeate side that is lower than the second feed pressure;

(iv) withdrawing from the second feed side a dehydrated ethanol product;

(v) withdrawing from the second permeate side a second permeate stream enriched in water compared with the first residue vapor stream;

(e) recovering latent heat of condensation from the first permeate stream by returning the first permeate stream as a vapor to the stripping section.

18. The process of claim 17, wherein the second permeate pressure is lower than the first permeate pressure.

19. The process of claim 17, further comprising lowering the second permeate pressure by cooling and condensing the second permeate stream.

20. The process of claim 17, further comprising condensing the second permeate stream and returning it as liquid to the rectification section.

21. The process of claim 17, wherein latent heat of condensation is recovered from the second residue vapor stream by bringing the second residue vapor stream into heat exchanging contact with a reboiler stream from the stripping section.

22. The process of claim 17, wherein a first portion of the compressed overhead vapor stream is brought into heat exchanging contact with the reboiler stream, thereby recovering latent heat of condensation from the first portion, and a second portion of the compressed overhead vapor stream is passed across the first feed side in accordance with step (c)(ii).

23. The process of claim 17, wherein the stripping section and the rectification section are incorporated in a single distillation column.

24. The process of claim 17, wherein the stripping section and the rectification section are incorporated in separate stripping and rectification columns.

25. The process of claim 17, wherein the distillation step is operated in such a manner as to provide an ethanol concentration in the range 75-85 wt % in the rectified vapor stream.

26. The process of claim 17, wherein the mixture has an ethanol concentration below 15 wt %.

27. The process of claim 17, wherein the mixture has an ethanol concentration below 6 wt %.

28. The process of claim 17, wherein the ethanol is made from biomass.

29. The process of claim 17, wherein the first membrane has a selectivity in favor of water over solvent of less than 100.

30. The process of claim 17, wherein a vacuum pump is used to lower the pressure on the first permeate side.

31. The process of claim 17, wherein step (e) is performed by returning the first permeate stream at a point where the permeate stream and an uprising vapor in the stripping section have about the same composition.

32. The process of claim 20, wherein the second permeate stream is returned at a point where the permeate stream and a downflowing liquid in the rectification section have about the same composition.

* * * * *